(12) United States Patent
Kochanneck

(10) Patent No.: US 6,438,453 B1
(45) Date of Patent: Aug. 20, 2002

(54) MULTIBLOCK ROBOT SYSTEM

(75) Inventor: Uwe Kochanneck, P.O. Box 102318, 44023 Dortmund (DE)

(73) Assignee: Uwe Kochanneck, Dortmund (DE)

( * ) Notice: Subject to any disclaimer, the term of this patent is extended or adjusted under 35 U.S.C. 154(b) by 0 days.

(21) Appl. No.: 09/562,673

(22) Filed: May 1, 2000

(30) Foreign Application Priority Data

May 31, 1999 (DE) .......................................... 199 24 851

(51) Int. Cl.$^7$ ............................................... G06F 19/00
(52) U.S. Cl. ...................... 700/245; 700/251; 701/22; 701/29; 701/36; 701/207; 701/300; 318/558; 318/568.11; 318/568.12; 74/490.03; 74/490.05; 901/1; 901/15; 901/23; 901/28
(58) Field of Search .................. 700/245, 251; 701/22, 29, 36, 207, 300; 318/558, 568.11, 568.12; 74/490.03, 490.05; 901/1, 15, 23, 28; 180/65.1

(56) References Cited

U.S. PATENT DOCUMENTS

| 4,232,988 | A | * | 11/1980 | Kochanneck | ................ | 414/331 |
| 4,252,488 | A | * | 2/1981 | Kochanneck | ................ | 414/331 |
| 5,241,875 | A | * | 9/1993 | Kochanneck | ............ | 74/490.03 |
| 5,850,762 | A | * | 12/1998 | Kochanneck | ............ | 74/490.03 |
| 5,852,353 | A | * | 12/1998 | Kochanneck | ................ | 318/558 |
| 6,014,597 | A | * | 1/2000 | Kochanneck | ................ | 701/22 |

FOREIGN PATENT DOCUMENTS

| DE | 2519864 | A | * | 11/1976 |
| DE | 02527150 | A | * | 12/1976 |
| DE | 02654194 | | * | 6/1978 |
| DE | 02938227 | | * | 3/1981 |
| DE | 03068787 | A | * | 3/1988 |
| DE | 0477725 | A | * | 3/1992 |
| DE | 19517852 | A1 | * | 12/1998 |
| DE | 19615943 | A1 | * | 12/1998 |
| DE | 19621668 | A1 | * | 1/2000 |
| EP | 547421 | A1 | * | 6/1993 |

* cited by examiner

Primary Examiner—William A. Cuchlinski, Jr.
Assistant Examiner—McDieunel Marc

(57) ABSTRACT

A multiblock robot system with to each other compatible- and plug connectable, stationary and mobile earth, sea, aviation, planetary and space flight capable multiblock robot system standard cells, multiblock robot flange plug booster units and multiblock robots. Reconstructable with minimal expenditure of development and construction and by optional combinations between each other and with the total spectrum of all multiblock robot standard parts, objective-directed used for stationary and mobile multiblock robot individual systems and total complexes for mainland, sea, aviation, planetary and space flight fields, always exchange-able to each other, removeable, disintegrateable and re-plug connectable to the most different multiblock robot system solutions.

10 Claims, 21 Drawing Sheets

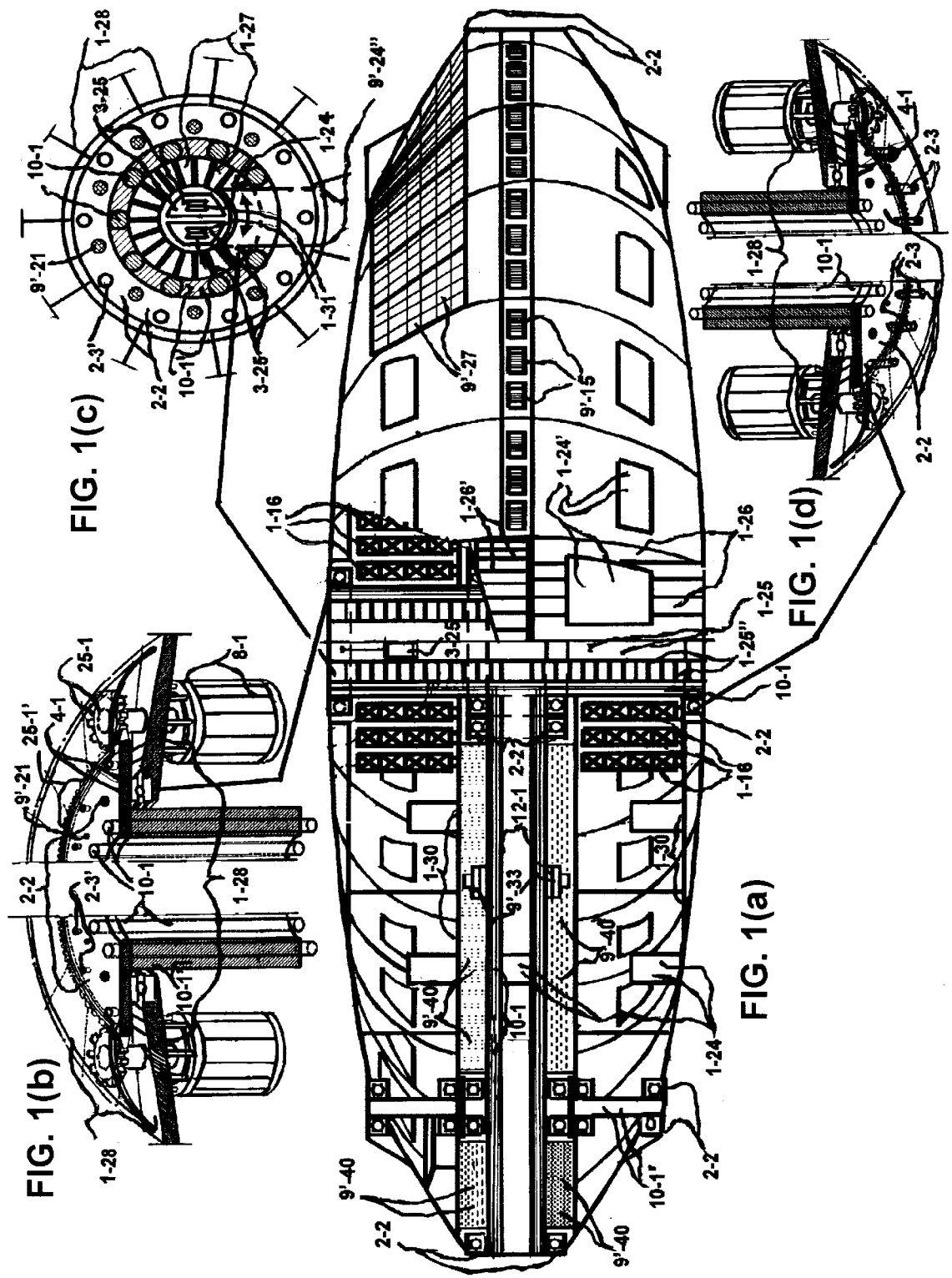

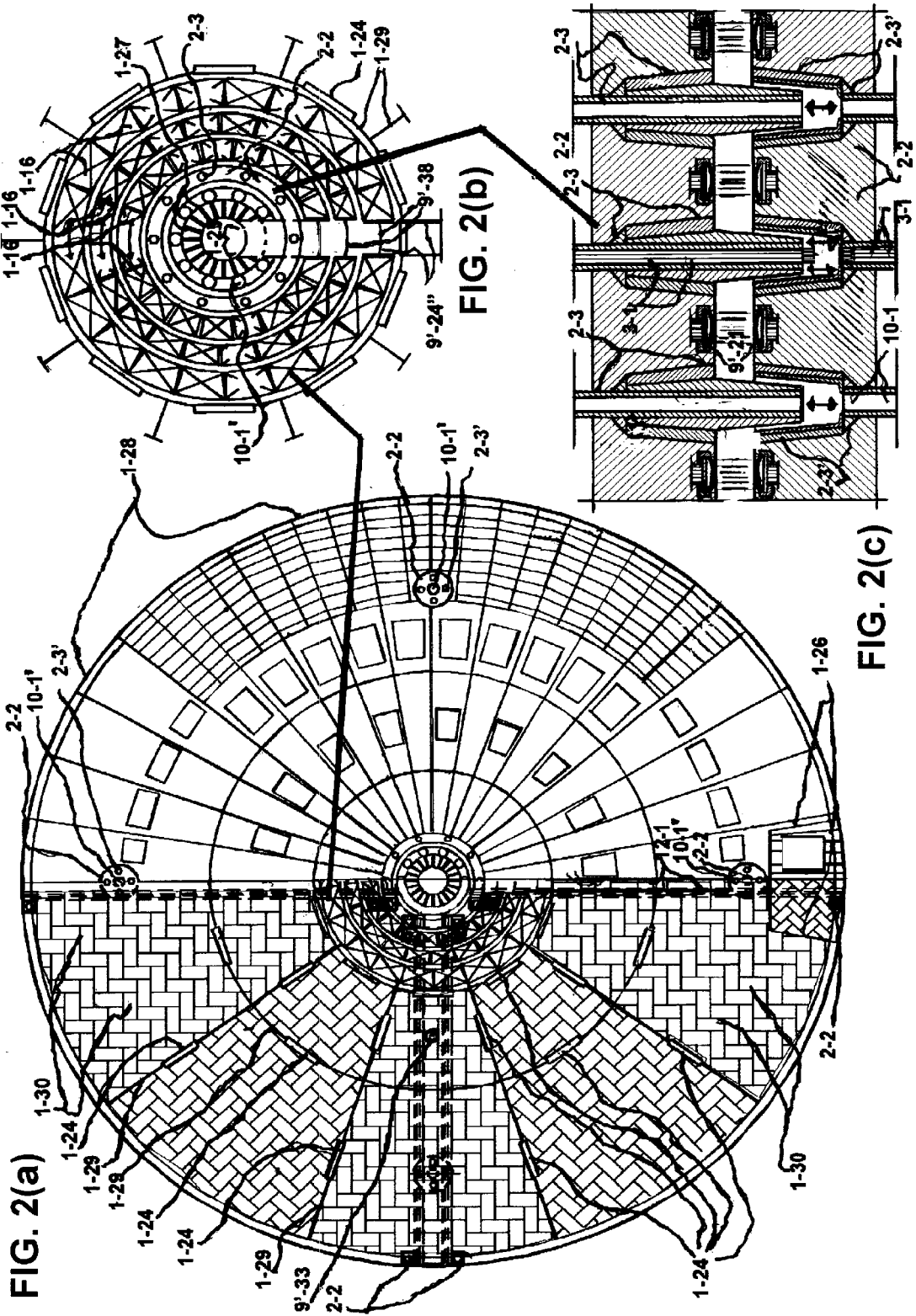

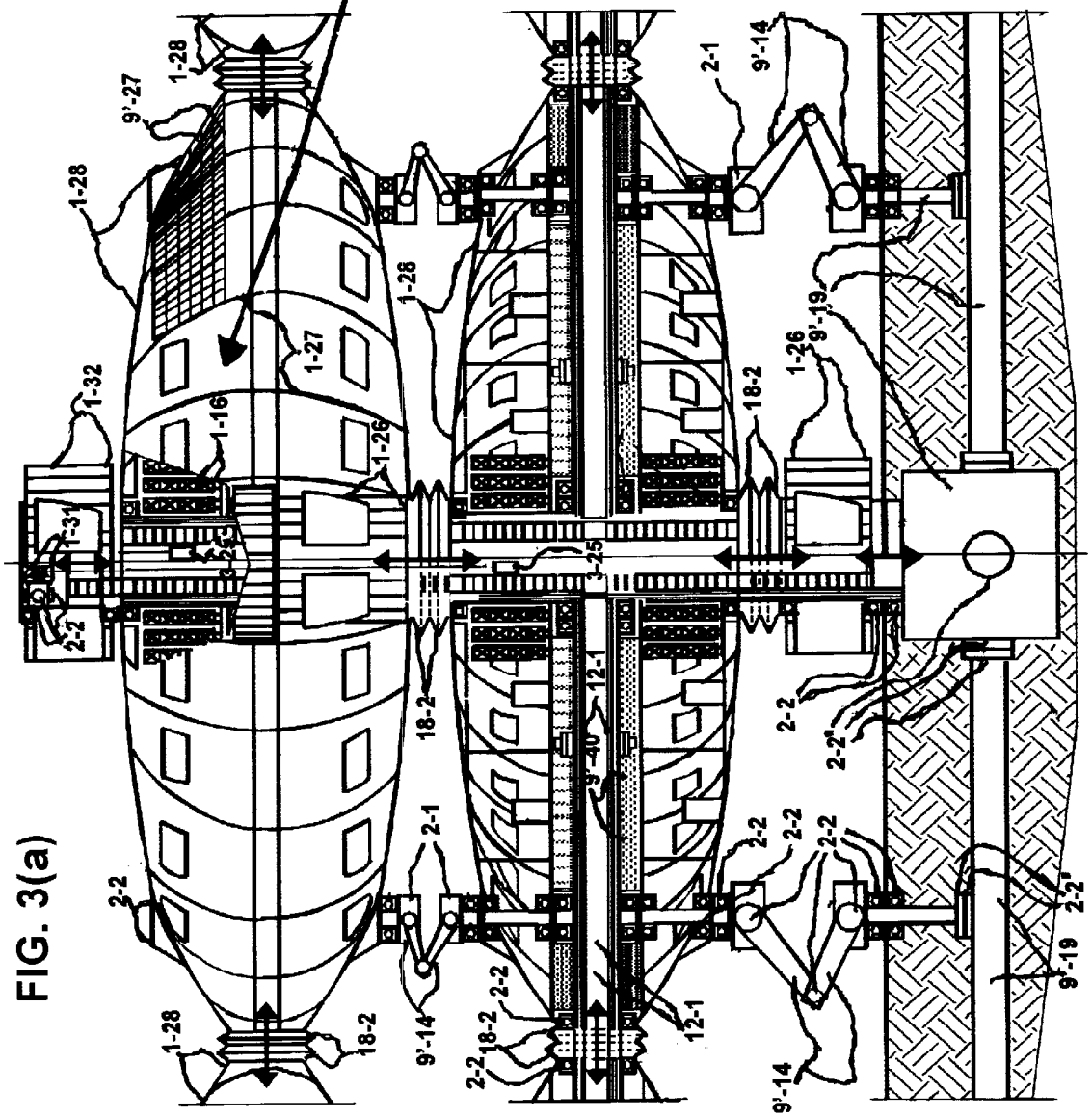

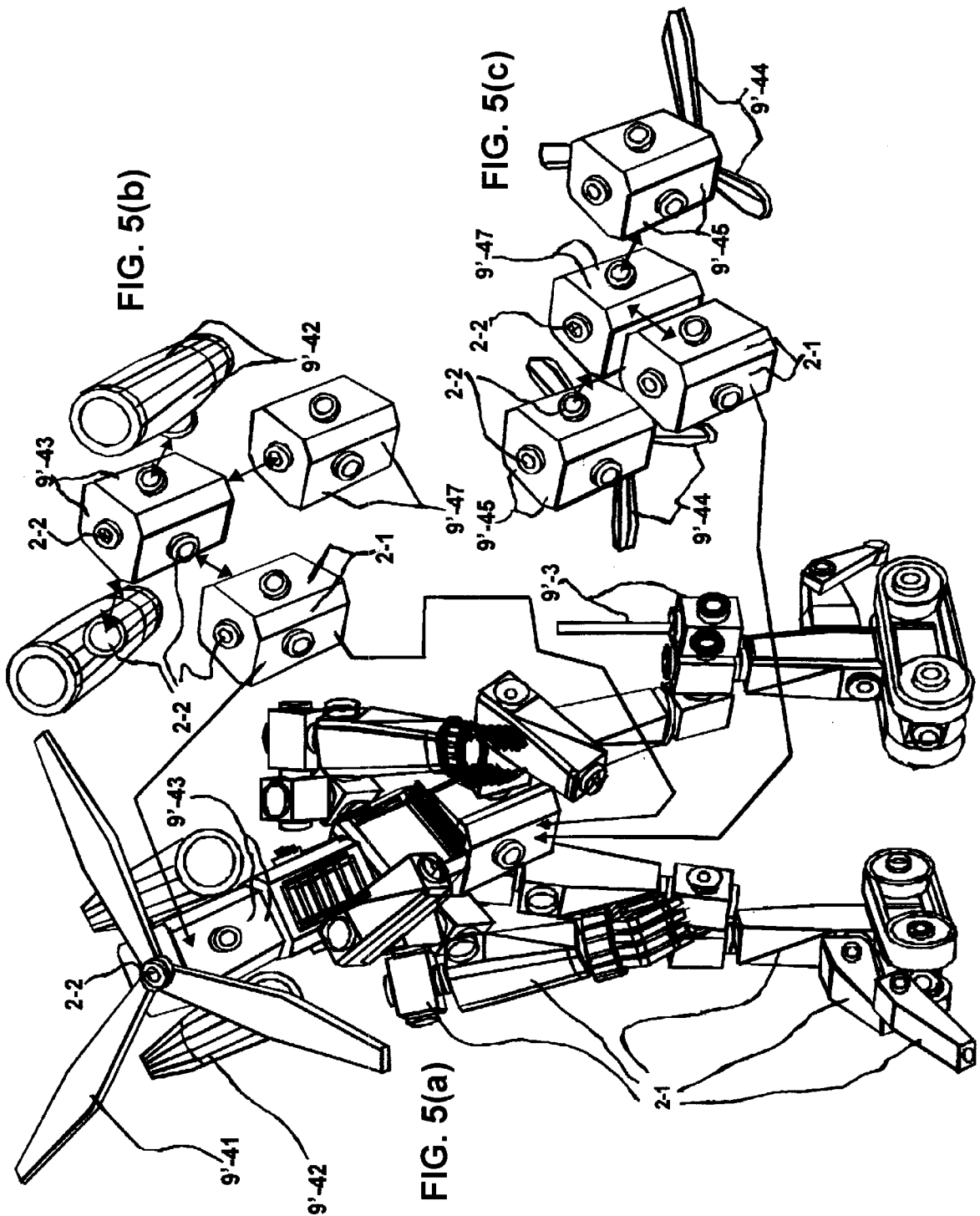

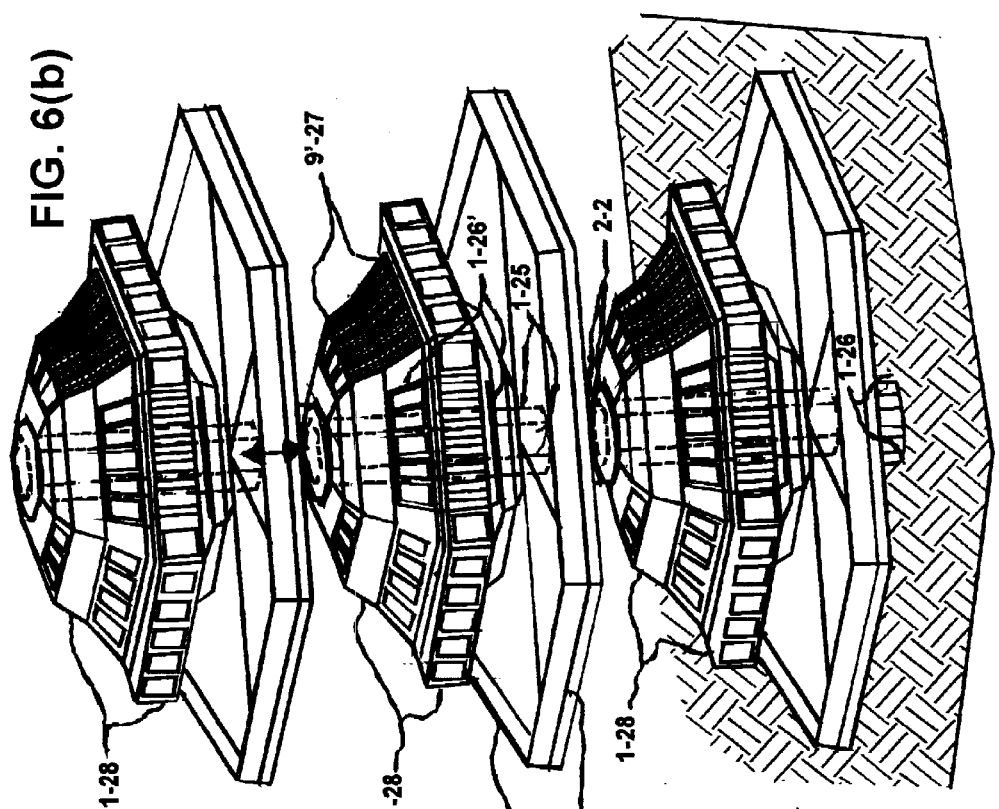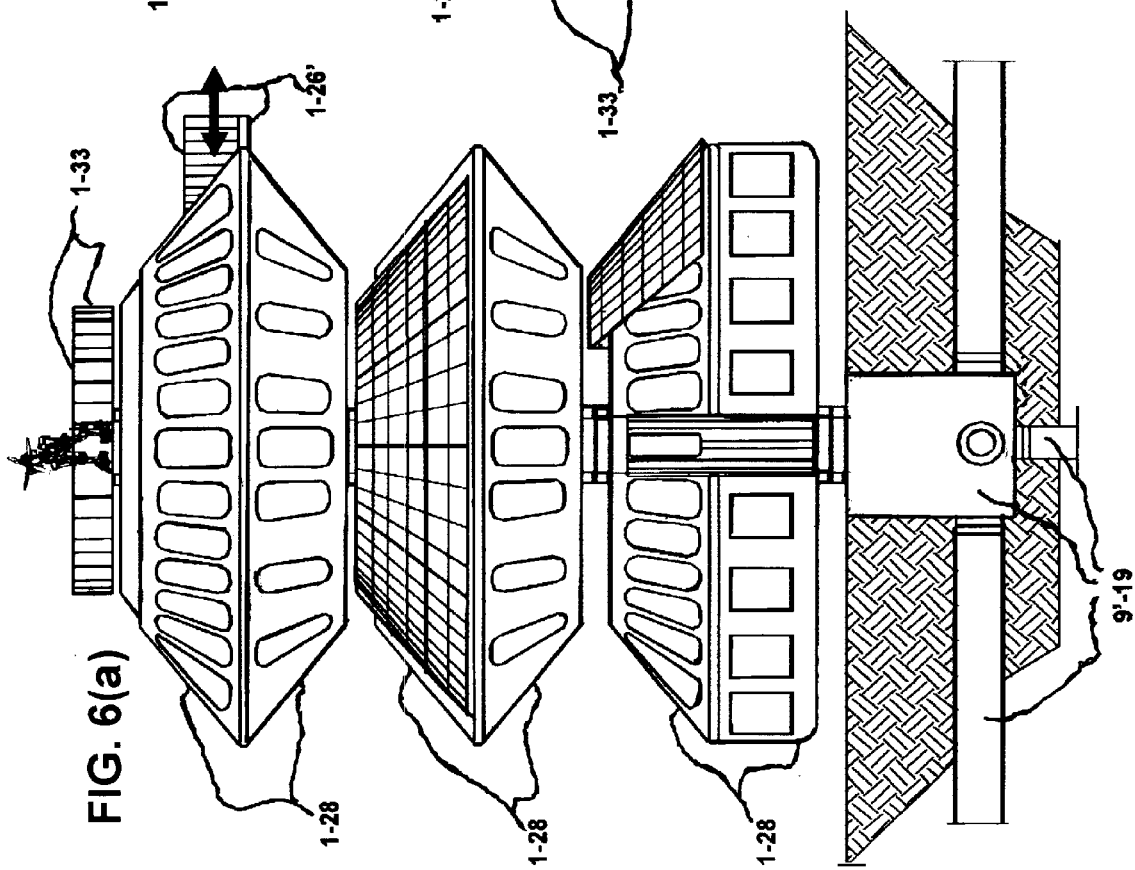

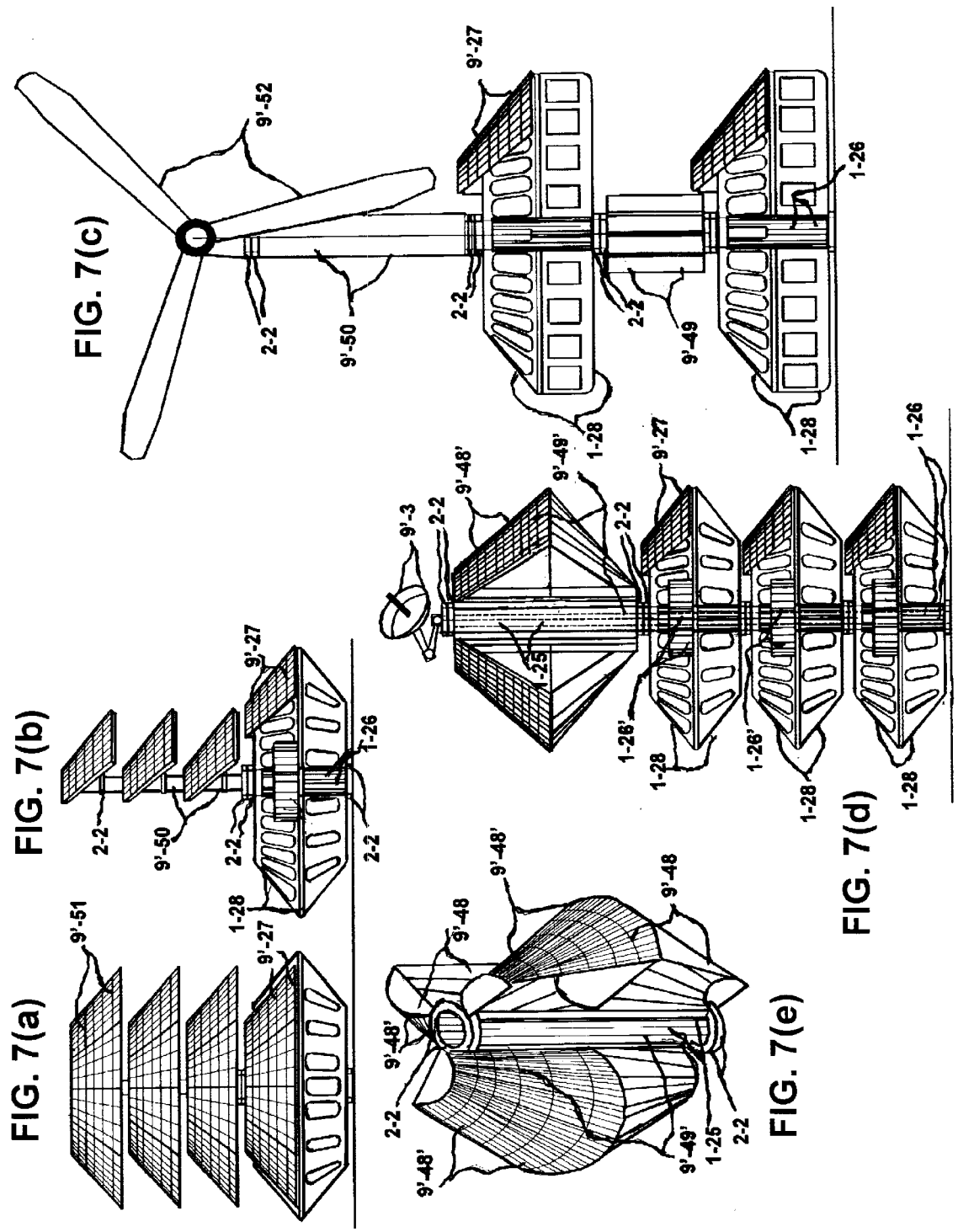

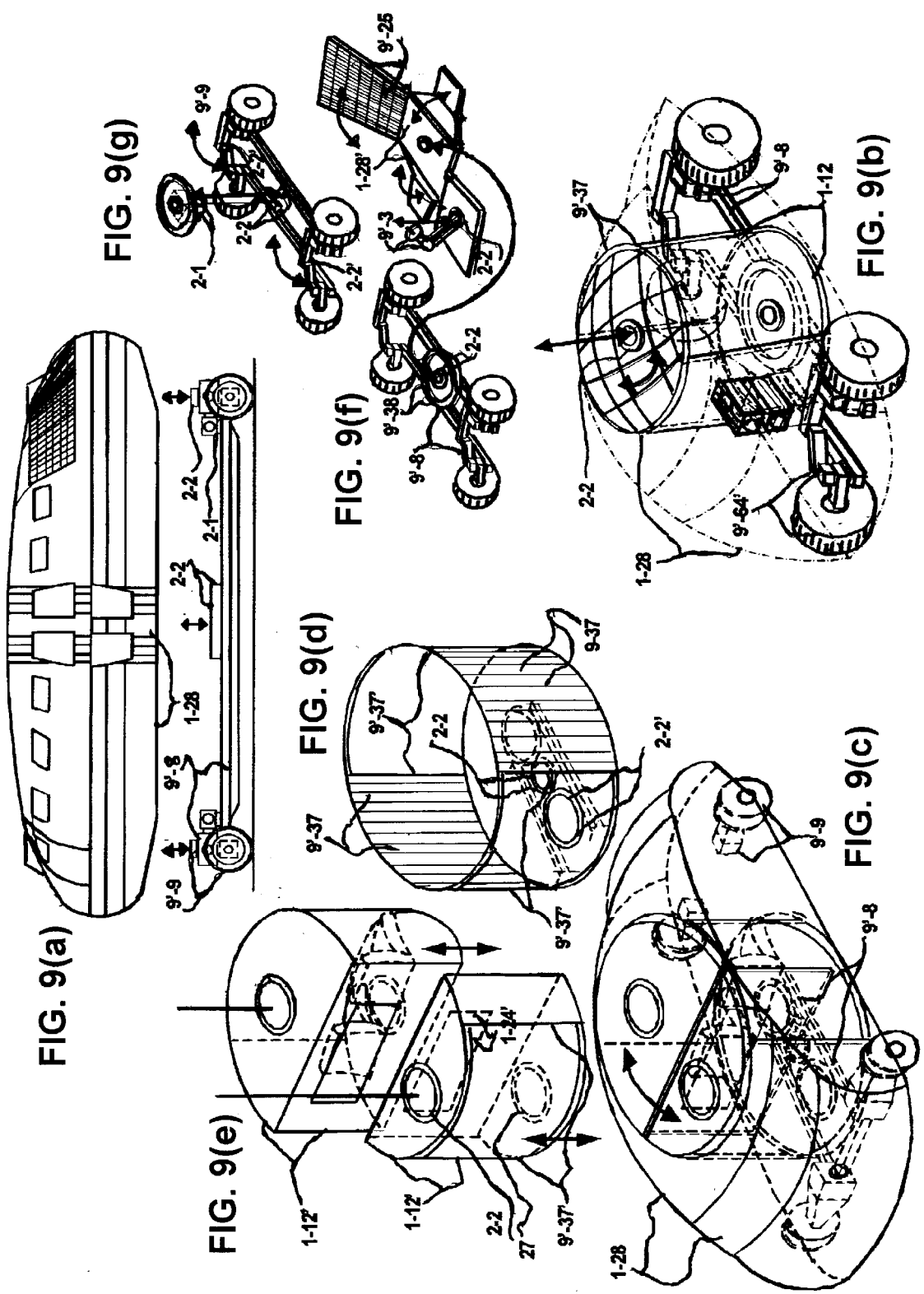

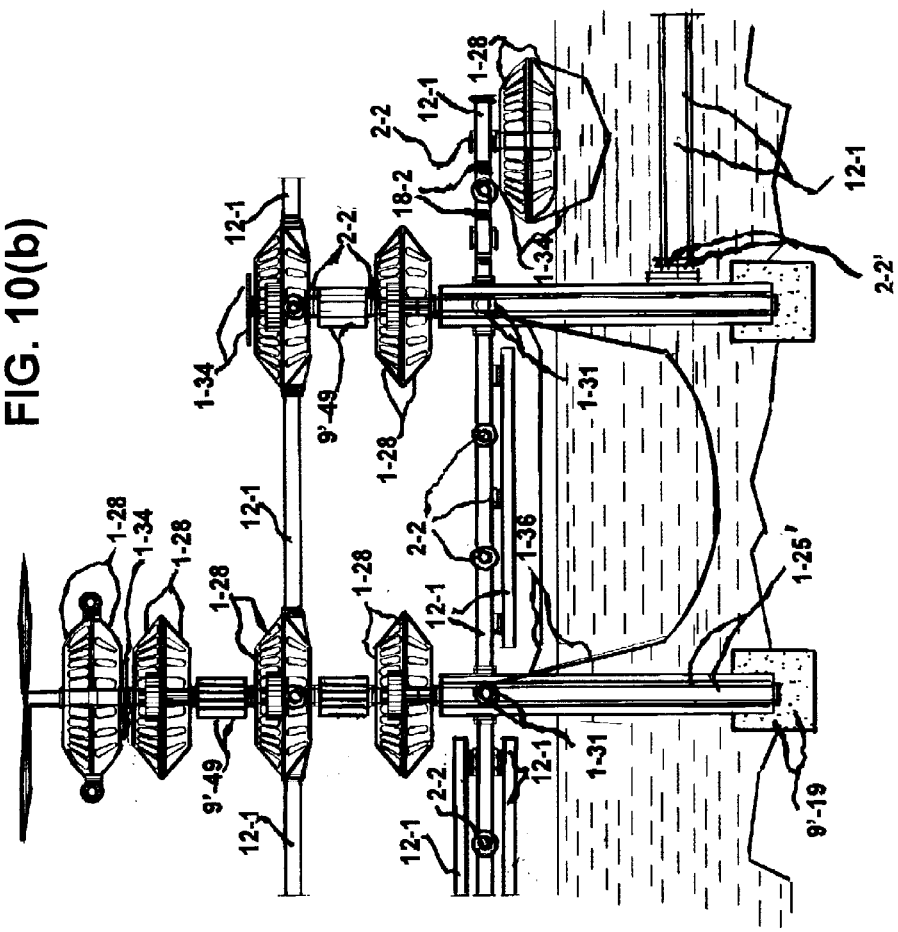
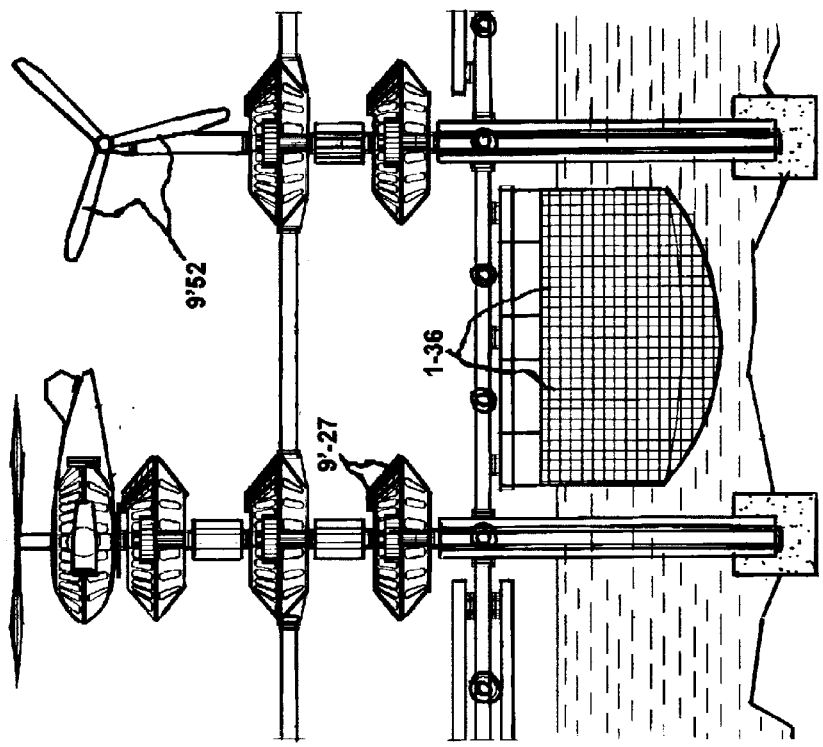

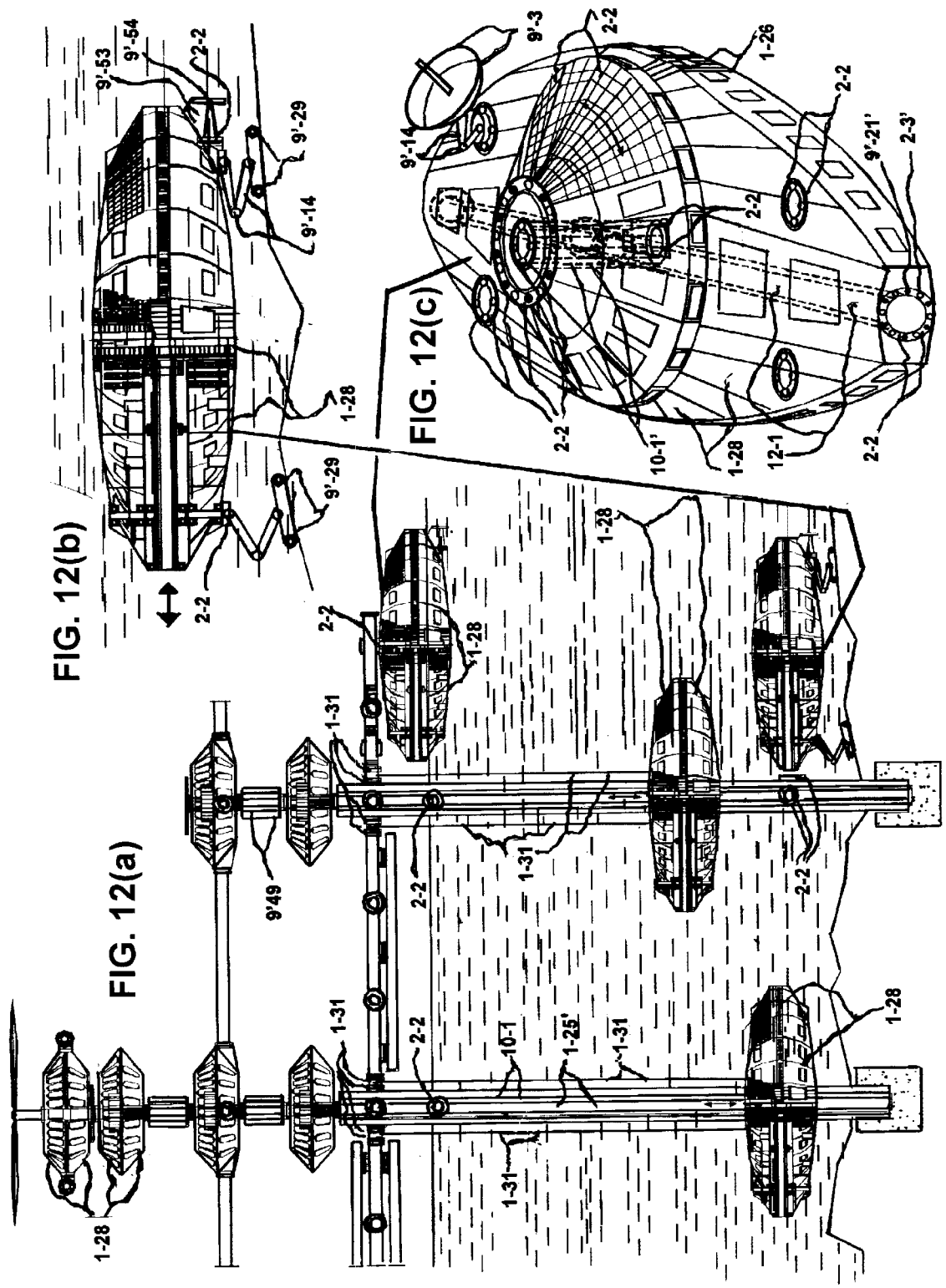

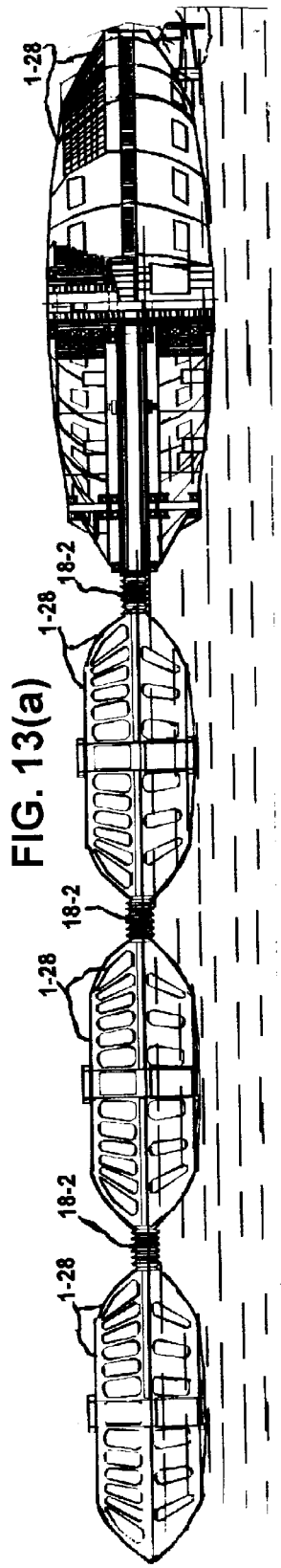
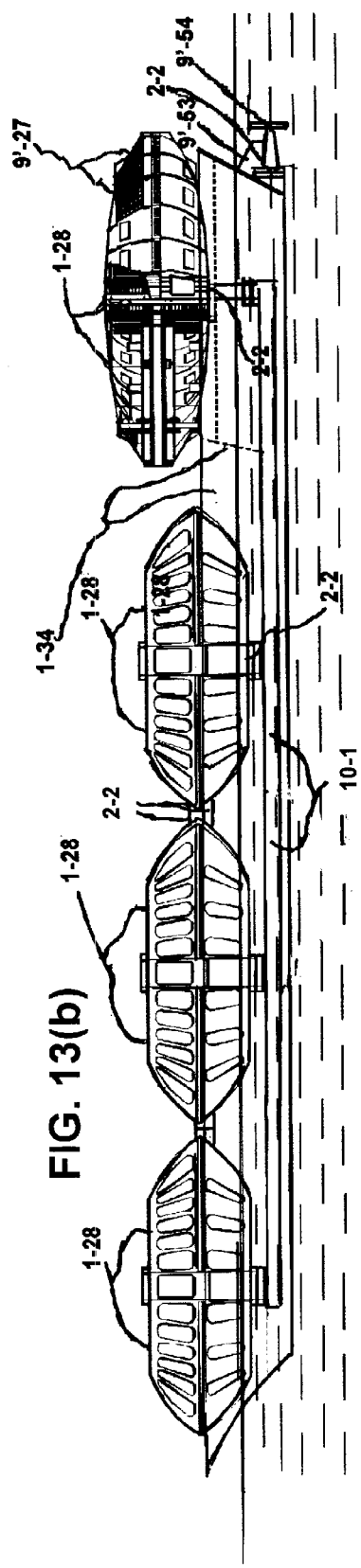
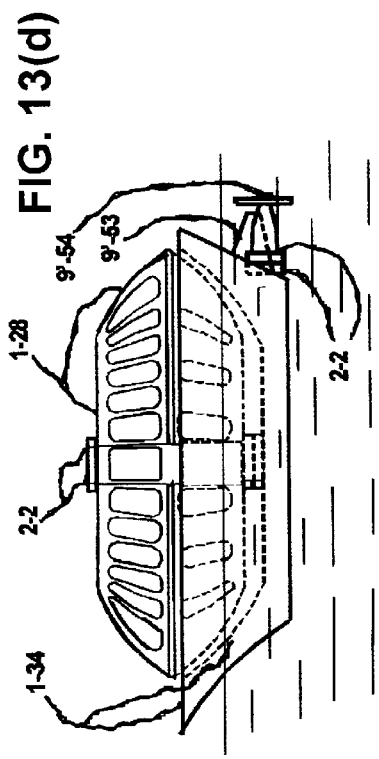
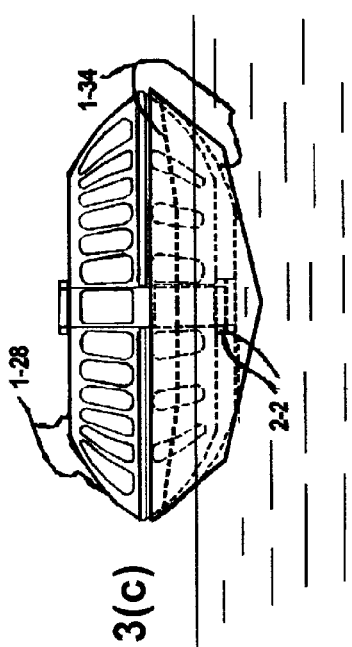
FIG. 13(a)
FIG. 13(b)
FIG. 13(c)
FIG. 13(d)

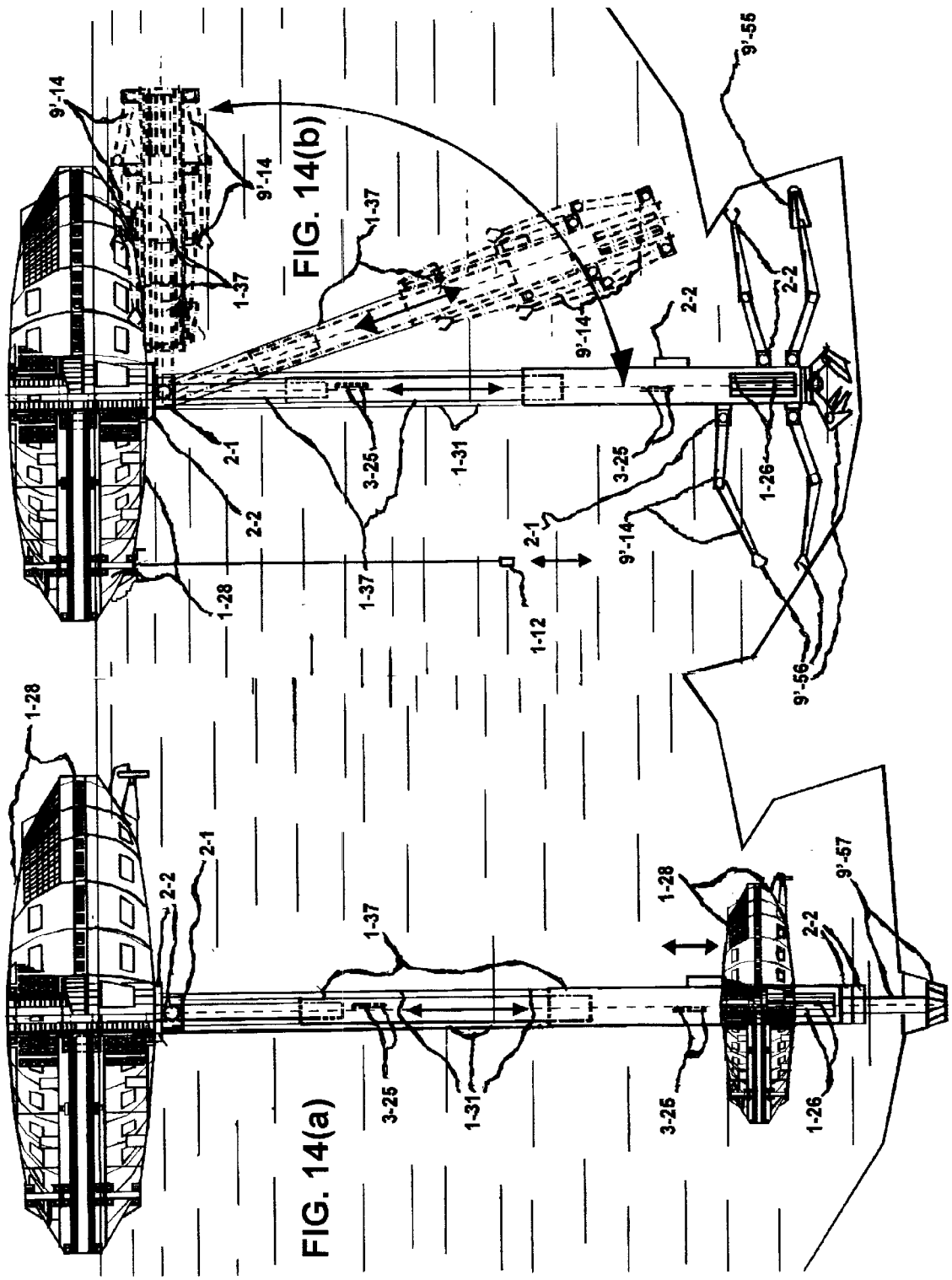

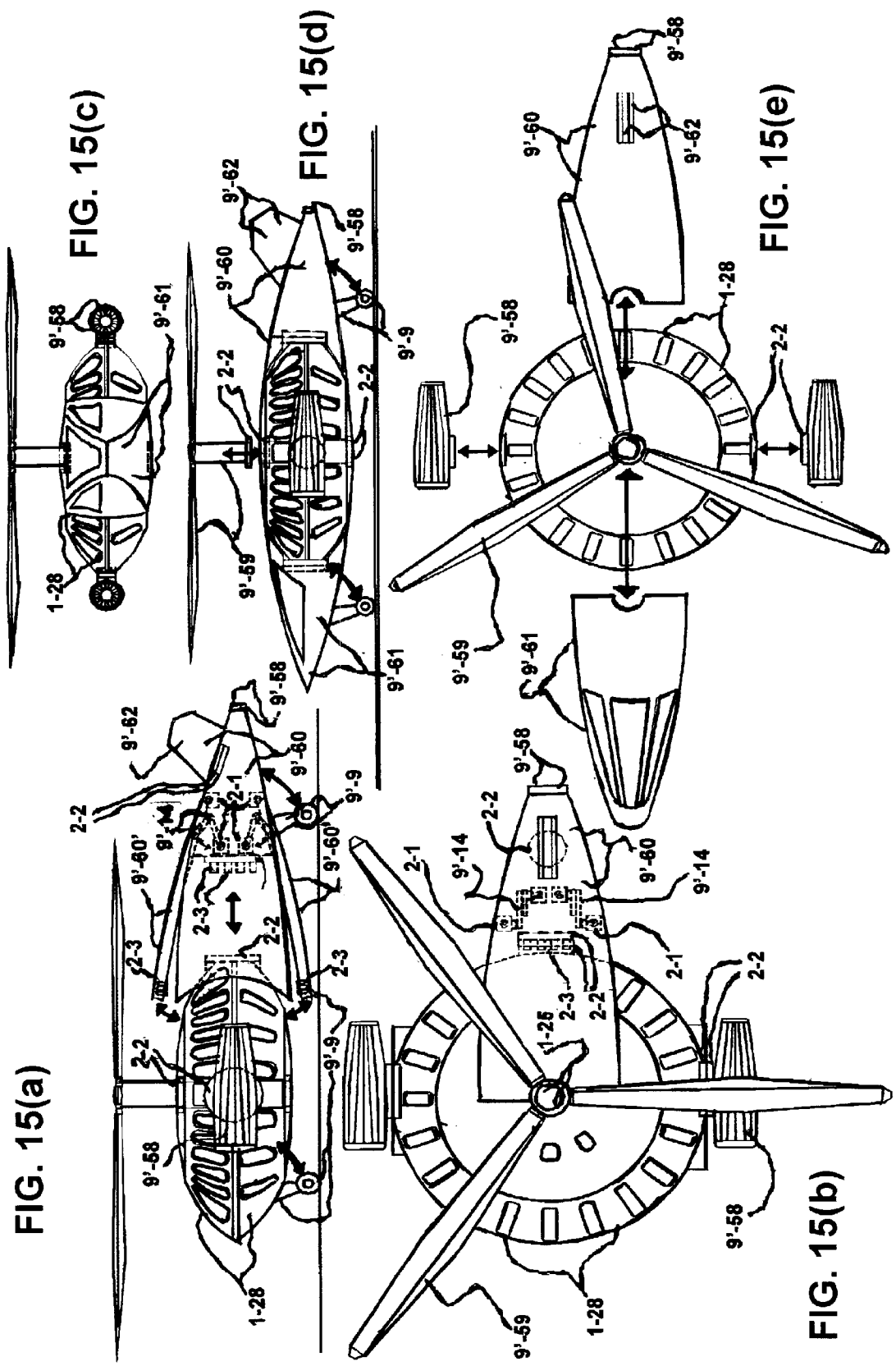

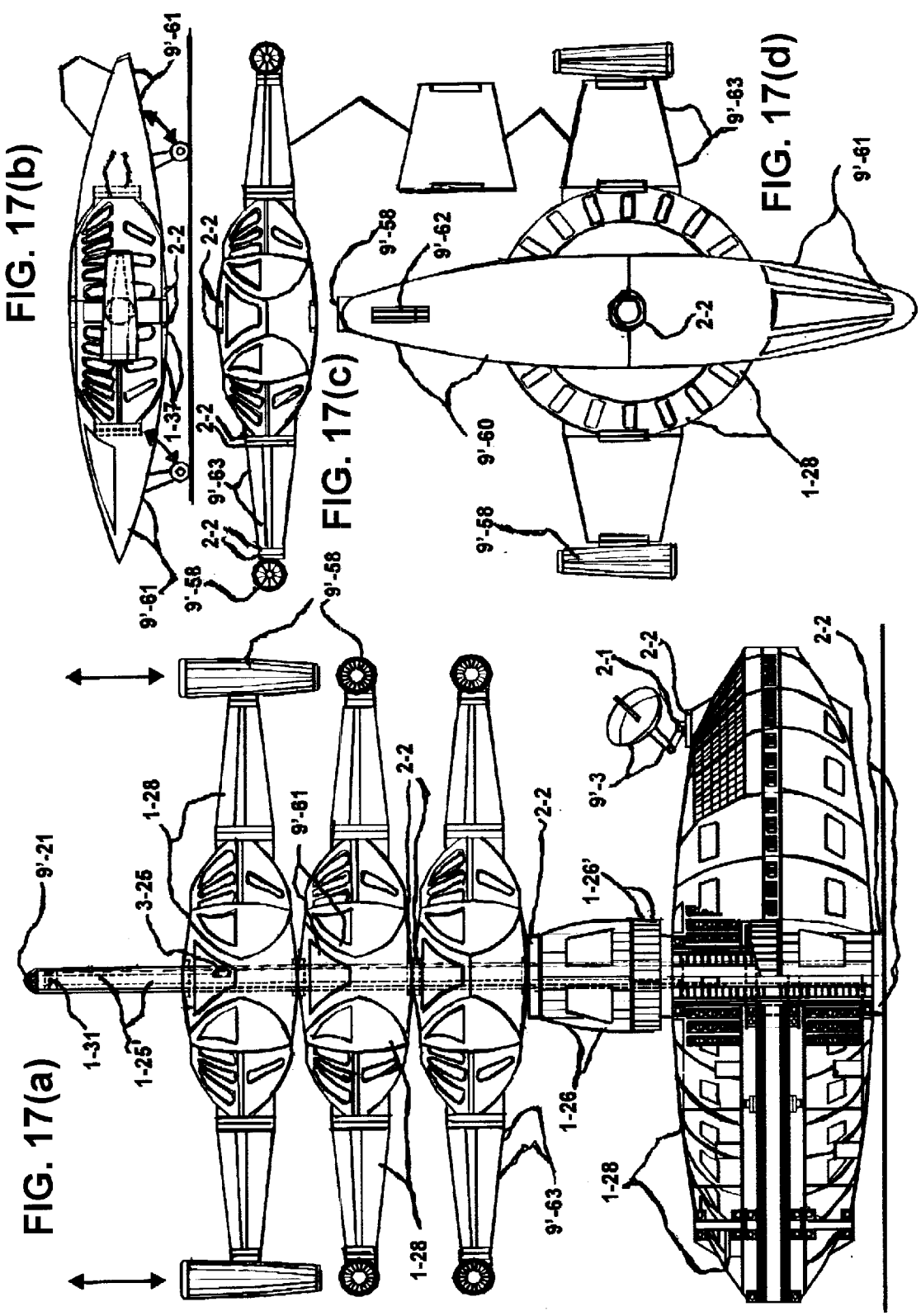

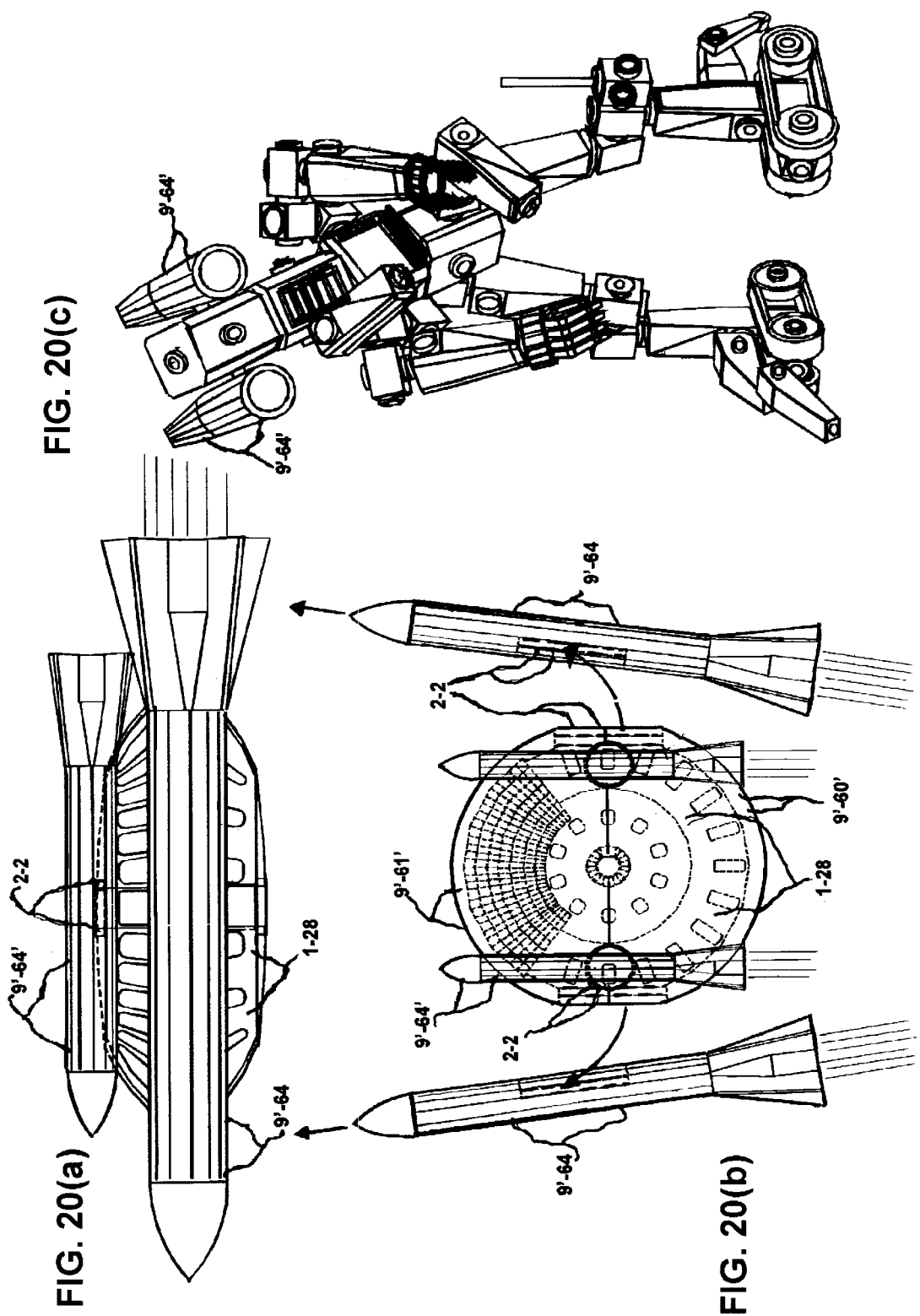

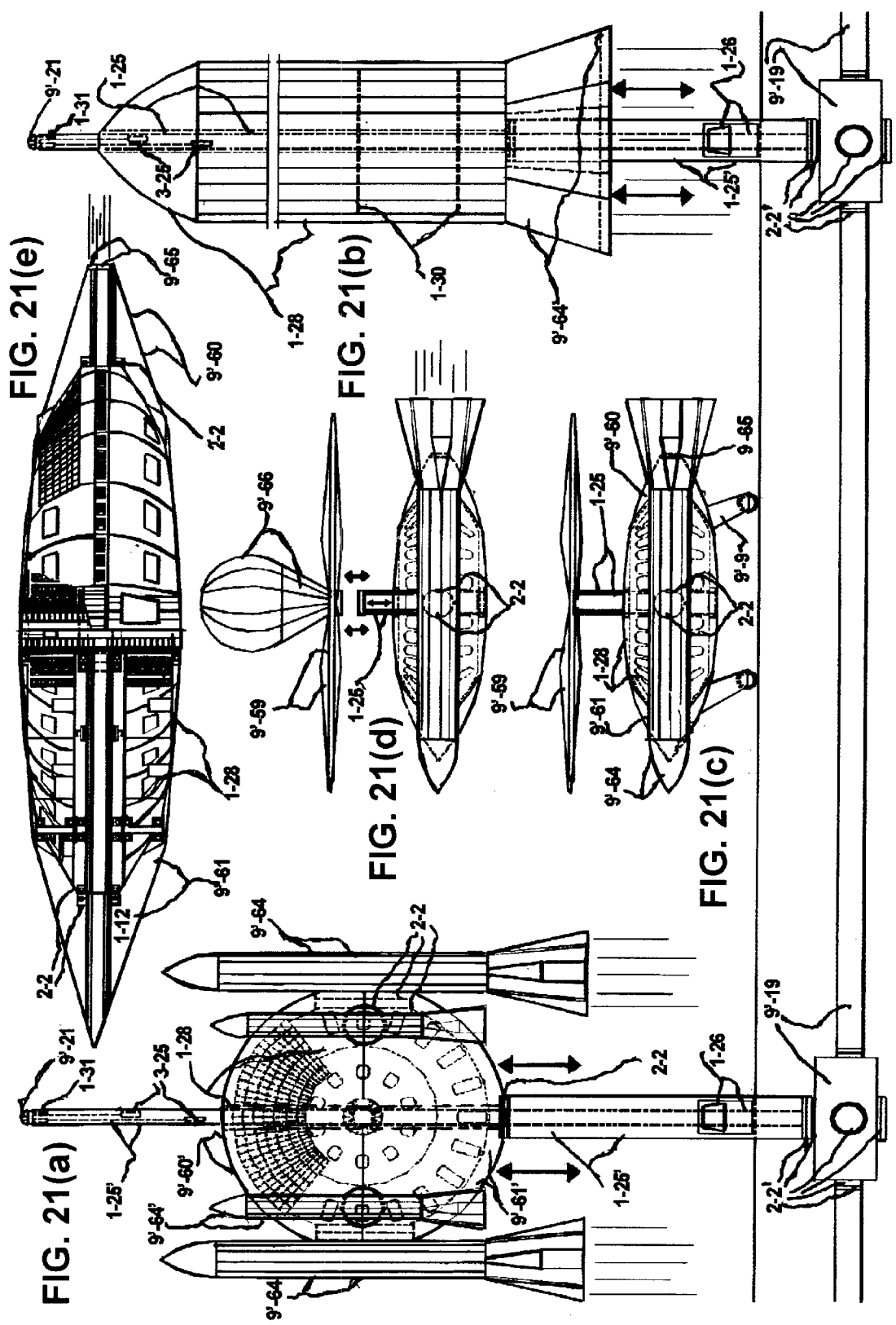

MULTIBLOCK ROBOT SYSTEM

FIELD OF THE INVENTION

The application relates to a multiblock robot system with to each other compatible multiblock robot system standard cells, multiblock robot flange plug booster units and multiblock robots which are used on earth, in the sea technique, in the aviation technique, in space and on other planets.

DESCRIPTION OF THE PRIOR ART

It is well known, as illustrated in U.S. Pat. Nos. 5,241, 875-5,850,762-5,852,353 and 6,014,597, as also in U.S. patent application Ser. No. 07/986,532 and 09/298,204, to provide multiblock robot systems with the advantage that object-directed multiblock total systems can be disintegrated and reconstructed with only a minimal expenditure of development and construction and with only a few handling operations by the users themselves for the originally aimed sphere of activities and which can be exchanged to each other and plug combined to other robot system solution.

SUMMARY OF THE INVENTION

It is an object of the present invention to increase further the advantages of economical manufacturing, functionality, the spectrum of operations and the application flexibilty of these multi-axis robot systems by introducing a small number of additional multiblock robot standard parts and the integration of to each other compatible multiblock robot system cells, multiblock robot flange plug booster units and multiblock robots for a standardized, all spheres of live comprising system technique, whose components are used on earth, in the sea technique, in aviation, rocket, space flight and planetary technique, thus raising further the number of pieces of all, one to the other compatible multiblock robot standard parts.

These objects are attained, according to the present invention, by providing with only a minimal expenditure of development and construction, to each other compatible and plug connectable stationary and mobile, earth, sea, aviation, planetary and space flight capable multiblock robot system standard cells and multiblock robots, with optional combination possibilities and interchangeability to each other and to the total spectrum of all multiblock robot standard parts for any desired multiblock robot system solution, for object-directed stationary multiblock robot individual systems and total multiblock robot mainland, sea, aviation and space complexes.

This arrangement is a considerable improvement over the prior-art systems, that by extending the multiblock robot system technique to the all spectra of live encompassing fields of applications, the variety, functionality and economical manufacturing of multiblock robots and other multi-axis systems is furthermore improved. In addition, totally new application perspectives are revealed on earth, in the sea technique, in aviation, on other planets and in space flight applications, where the use of multiblock robots is indispensable and reaches an additional economic efficiency and formative influence, by the creation of a multiblock robot favourable environment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1a,b,c is a front view with a partial sectional view of a multiblock robot system standard cell; the perspective detail of a sub-view in direction of the continuous view-line of the central rotation flange plug connection; the perspective plain view detail of the central rotation flange plug connection; the plain view detail to the central rotation flange plug connection, to the central supply channel in a sectional view and, to the central access channel;

FIGS. 2a,b,c, is the plain view with a partial sectional view of the multiblock robot system standard cell in accordance with FIG. 1; the plain view detail to the central rotation flange plug connection with central supply and access channel, as also to three centrally arranged, concentric ring bodies, the section of the front view through two multiblock robot system standard cells in the region of the rotation flange plug connections, in the moment of the plug connection operation;

FIGS. 3a,b, is the front view with a partial sectional view of stationary, one above the other and side by side to each other plug connected, in x- and y- direction movement flexible multiblock robot system standard cells, in accordance with FIG. 1, comprising multiblock robot entrance and roof flange plug booster units; a perspective illustration with a partial sectional view of two multiblock robot system standard cell partial segments, prepared for the plug connection operation;

FIGS. 5a,b,c, the perspective illustration of a multiblock flight robot; the accessory flange plug booster units for the flight capability; the accessory flange plug booster units for the conversion of the multiblock flight robot to a multiblock flight and under water robot;

FIGS. 6a,b, three one above the other plug connected multiblock robot system standard cells with different outer contour, directly plug connected to a ground installed supply channel flange plug booster unit and in head position, with an intermediate platform flange plug booster unit and a landed multiblock flight robot; three one above the other plug connected multiblock robot system standard cells with identical outer contour and intermediate platform flange plug booster units;

FIGS. 7a,b,c,d,e, the front view of an energy autonomous multiblock robot system standard cell; the energy autonomous multiblock robot system standard cell rotated around 90°; an energy autonomous multiblock robot total complex with two one above the other plug connected multiblock robot system standard cells, in mid position with a vertical wind rotor flange plug booster unit and in head position with a wind propeller flange plug booster unit; an energy autonomous multiblock robot total complex with three one above the other plug connected multiblock robot system standard cells and in head position with a vertical wind-solar flange plug booster unit; the wind flange plug booster unit in a perspective illustration;

FIGS. 9a,b,c,d,e,f, the side view of, on a road moved multiblock robot system standard cell, which is plug connected to a multiblock robot e-pool vehicles chassis flange plug booster unit, composing a multiblock robot e-pool transporter; the perspective view of, on a road moved multiblock robot system standard cell, plug connected to a multiblock robot e-pool vehicles chassis flange plug booster unit, composing a multiblock robot e-pool individual car; separately illustrated, the pivotable inside compartment unit; the persons box and the load box; the perspective view of a planetary ground vehicle for pilots, with pilot oxygen box, as also the folding vehicle chassis flange plug booster unit of a planetary ground vehicle for multiblock robots; the accomodation platform for multiblock robots; the folded accomodation platform flange plug booster unit;

FIGS. 10a,b, the side view of a multiblock robot total sea complex with application fields and one above the other plug connected stationary multiblock robot system standard cells and connection between each other through the multiblock robot access flange plug booster units, as also to the left in head position, the landing of a multiblock robot helicopter, in accordance with FIG. 15; the side view of the multiblock robot total sea complex, with loading and unloading of a multiblock robot ship flange plug booster unit;

FIGS. 12a,b,c, the side view of a multiblock robot total sea complex, in accordance with FIGS. 10,11, with additional ground and sea mobile underwater multiblock robot system standard cells, as also the loading and unloading of a water moved multiblock robot system standard cell; the ground and sea mobile underwater multiblock robot system standard cell in a magnified illustration; the perspective illustration of the water moved multiblock robot system standard cell;

FIGS. 13a,b,c,d, the side view of four water moved multiblock robot system standard cells, with rotation flexible connection to a multiblock robot system standard cell, provided with multiblock robot rudder and propulsion propeller flange plug booster unit; the four multiblock robot system standard cells stationary plug connected to a multiblock robot ship carrier flange plug booster unit, having a multiblock robot rudder and propulsion propeller flange plug booster unit; the side view of a multiblock robot system standard cell, stationary plug connected to a multiblock robot ship carrier flange plug booster unit, provided with multiblock robot rudder and propulsion propeller flange plug booster unit; the side view of the multiblock robot ship carrier flange plug booster unit;

FIGS. 14a,b, the side view of a water moved multiblock robot system standard cell with rotatable underwater telescopic flange plug booster units, which are provided with gripper arms; the side view of the water moved multiblock robot'system standard cell with under water telescope flange plug booster units, in accordance with FIG. 13, having a multiblock robot drill head flange plug booster unit and vertically movable, along the telescope guided sea mobile underwater multiblock robot system standard cell;

FIGS. 15,a,b,c,d,e, the side view of a multiblock robot system standard cell, provided with a ground floor drive, vertical rotor, propulsion and tail flange plug booster units for the aviation capable helicopter use; the plain view of the plug connected multiblock robot helicopter; the front view of the plug connected multiblock robot helicopter with cockpit and tail flange plug booster unit; the side view of the multiblock robot helicopter with cockpit and tail flange plug booster units; the plain view of the multiblock robot system standard cell during plug connection for the aviation suitable helicopter use, provided with vertical rotor, propulsion, as also cockpit and tail flange plug booster units;

FIGS. 17a,b,c,d, the front view of a multiblock robot aviation complex, provided with separate vertical supply channel, as also with a stationary on the ground plug connected multiblock robot system standard cell, above it a multiblock robot roof flange plug booster unit and above this, three landed, vertically takeoff capable multiblock robot airplanes; the side view of a multiblock robot airplane; the front view of a multiblock robot airplane; the plain view of a multiblock robot airplane with separately illustrated wing flange plug booster unit;

FIGS. 20,a,b, the side view of a multiblock robot total space complex with outside multiblock robot liftoff rocket flange plug booster units and centrally plug connected liftoff-space flange plug booster units; the plain view of a multiblock robot aviation complex, disconnecting the out-sided liftoff rocket flange plug booster units and switching over to the left and right sided liftoff-space rocket flange plug booster units; the perspective view of an accessory multiblock space robot with space rocket flange plug booster units;

FIGS. 21,a,b,c,d,e, the front view of a multiblock robot total space complex in accordance with FIG. 18a, however on a separate access channel liftoff ramp; the front view of a multiblock robot individual space unit on a separate access channel liftoff ramp; the side view of a multiblock robot total space complex in accordance with FIG. 18c, however provided with an own vertical lift propeller for the liftoff from the high atmosphere; the multiblock robot total space complex, reaching the right rocket liftoff height and disconnecting the vertical liftoff propeller with a parachute; a multiblock robot space station with own tail rocket propulsion flange plug booster unit.

Figure 4B:
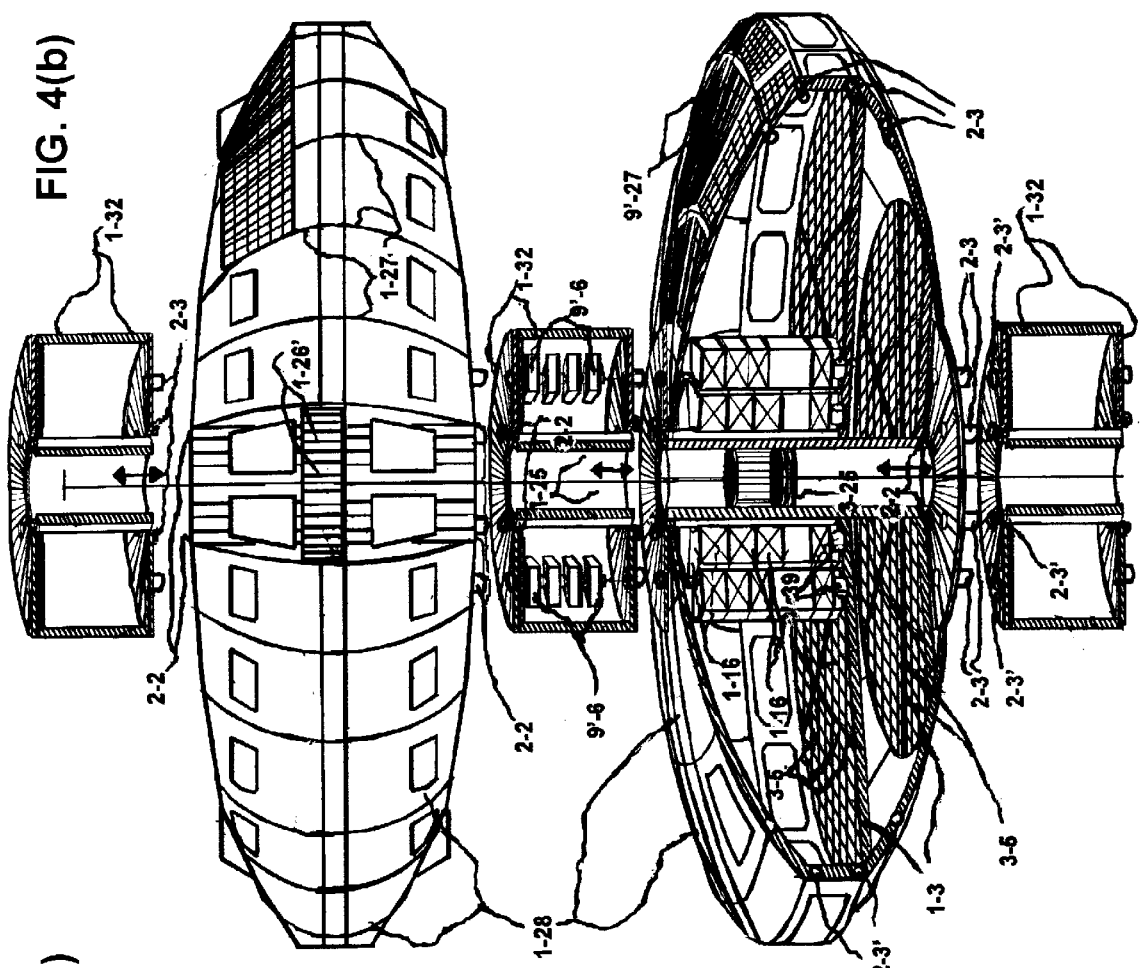
FIGS. 4a,b, the perspective view of three stationary, directly one above the other plug connected multiblock robot system standard cells, with central access channel, intermediate floors and always two centrally arranged, concentric ring bodies and, with multiblock robot entrance and roof flange plug booster units; in a perspective illustration, the front view of two, one above the other plug connected multiblock robot system standard cells, with central access channel, a multiblock robot entrance flange plug booster unit and always a multiblock robot roof flange plug booster unit.

Movement arrows in the Figs. show the movement direction of the system parts, continuous lines with and without view direction arrows from fig. to fig. show the origin and view direction for separated sub-views, sections and system details of the respective figs. Dash dot lines show the contours of possible multiblock robot accessories. The different dessignations and numerals are to a large extend used in analogy to the previous multiblock robot patents and applications, named at the beginning.

DESCRIPTION OF THE PREFERRED EMBODIMENTS

FIGS. 1, 2, 3

The multiblock robot system standard cells 1-28 are multiblock room units which in the basic conception are designed like the multiblock robot standard parts and flange plug booster units in accordance with U.S. Pat. No. 5,241,875 and U.S. patent application Ser. No. 07/986,532. They are equally of nearly the similar design to each other and have central rotation flange plug connections 2-2 with current and communication channels, running horizontally and vertically through the multiblock robot system standard cells 1-28. However, in correspondence with the respective needs, for the multiblock robot system standard cells, the known current and communication channels of the multiblock robot standard parts are replaced by supply channels 10-1',9'-40 and access channels 12-1,1-25. The supply channels 10-1' accomodate supply lines 10-1 of the most different kind, as current and communication lines, fuel and general fluid feeding and derivation lines. In accordance with the respective objective for the multiblock robot system standard cells 1-28, the supply channels 10-1' are surrounded of fluid channels 9'40, leading water, fuels, hydraulic fluids and other necessary production and operation fluids. The horizontal access channels 12-1 are used for person and multiblock robot passages. They are always in the center of the respective, concentrically to each other arranged, supply and access channels 10-1', 9'-40, 12-1, 1-25. The access channels 1-25 are vertical channels for tackle line and hydraulic lift plug booster units 3-25, provided for the lifting and lowering of loads, persons and multiblock robots. Especially for stationary multiblock robot system standard cells 1-28, the vertical access channels 1-25 for tackle line and hydraulic lift plug booster units 3-25, are surrounded by staircase installations 1-25". The vertical supply channels 10-1' and access channels 1-25 are surrounded by concentric equipment rings 1-16 for materials and devices. The multiblock robot system standard cells 1-28 are provided with intermediate floors 1-30 and intermediate walls 1-29, having sliding doors 1-24. The outer contour has a multiblock segment solar flange plug booster unit 9'-27, window openings 1-24', an internal entrance flange plug booster unit 1-26 with sliding doors 1-24 to the outside and to the inside and, a transition to the horizontal access channels 12-1. An internal, retractable platform 1-26', to the outside covered by a balustrade, is provided above the internal entrance flange plug booster unit 1-26. For the free access from the horizontal access channels 1-25 to the vertical access channels 1-25, the concentric, vertical supply channels 10-1', 9'-40 and the vertical access channels 1-25, have also sliding doors 1-24. The access and transition from the intermediate floors 1-30 through the concentric equipment rings 1-16 is possible, if these are rotated on its annular chassis tracks 9'-38 and thus, in the range of the sliding doors 1-24 of the vertical access channels 1-25, composing each an access opening 1-24". The transition to the intermediate floors 1-30 is also possible from the horizontal access channels 12-1. For this, the supply channels 10-1', 9'-40, concentrically to each other arranged, have also sliding doors 1-24 in its side walls. The total multiblock robot system standard cell 1-28 is supported in analogy to the multiblock robot standard parts of the patents and patent applications named at the beginning, having in head and bottom position turning attachments 41 and thus, being freely rotatable around the center axis and the vertical supply and access channels 10-1', 9'40, 1-25, by the driving motors 8-1, the gear rim 25-1', the transmission gear 25-1 of the rotation flange plug connection 2-2. However, for each of the different rotation positions, the access to the supply channels 10-1', 9'40,125 and to the supply lines 10-1 is always maintained. But, in accordance with U.S. Pat. No. 5,850,762, there are also provided non-rotatable flange plug connections 2-2', having the most different design. Moreover in analogy to the multiblock robot patents and patent applications named at the beginning, the vertical and horizontal supply and access channels 10-1', 9'-40, 12-1, 1-25 are closed by sliding doors 1-24 and have in head and bottom position, on the horizontal exits and on all positions where are provided rotation flange plug connections 2-2 and non-rotatable flange plug connections 2-2', plug sleeves 2-3' and plug units 2-3, as also corresponding clamp and locking devices for the plug connection to adjacent rotation and non-rotational flange plug connections 2-2, 2-2' and the connection of the supply and access channels 10-1', 1-25, 9'-40, 12-1 and for the plug connection of the supply and access lines 10-1. In so far, the conceptions for the rotation flange plug connections 2-2 of the multiblock robot system standard cells 1-28 and different multiblock robot booster units, are identical to the conceptions of the rotation flange plug connections 2-2 of the multiblock robot, shown in FIG. 5, and follow the same conceptions as for the multiblock robot standard parts and multiblock robot flange plug booster units of the patents and patent applications named at the beginning, but the dimensioning is different The supply channels 10-1' consist of horizontal ring bodies with inner ring and outer ring walls, whereas the supply lines 10-1 are installed inside of the ring body, or the ring body with inner and outer ring walls composes partly or totally itself a supply line 10-1, as for the lead of fluides. But, the supply channels 10-1', 9'-40 are optionally also composed, only of ring-shaped to each other installed supply lines 10-1, without any inner and outer ring walls, and moreover of a ring-shaped solid wall, accomodating the supply lines 10-1 in distances to each other, as shown in FIG. 1*b*, 1*d*. The provided supply lines 10-1 have in its end positions plug units 2-3 and plug sleeves 2-3', these being sheathed of sealing materials 2-3" and conical designed in a way, that in the moment of plug operations, a centering effect facilitates the plug connection of the respective rotation flange plug connections 2-2, being in opposite position to each other. At the same time, the sheathings with the sealing materials 2-3" provide sealed secured connections at the transition points of the supply lines 10-1 with the plug units 2-3 and plug sleeves 2-3', if the supply channels 10-1', 9'-40 are finally plug connected to each other. The plug units 2-2 and plug sleeves 2-3' on the periphery of the rotation flange plug connections 2-2, have only a centering effect for the rotation flange plug connections 2-2 to each other and are identically designed as the plug units 2-3 and plug sleeve units 2-3', for the plug connection of the supply lines 10-1 within the supply channels 10-1'. The approximation sensors shown in FIG. 2*c* are provided for the positioning and alignment of different rotation flange plug connections 2-2 with its inside supply channels 10-1' and supply lines 10-1. There is a centrally installed supply line 10-1 with current and communication lines 3-1, and always to the right and to the left side, is installed a supply line 10-1 for fluids. The multiblock robot system standard cells 1-28 are composed of component segments 1-27, in accordance with FIG. 3b, having plug units 2-3 at on side of the segment edges for the connection to each other and at the outer edges in direction to the center, for the connection with the rotation flange plug connections 2-2 and, the counterparts of the component segments 1-27 for plug connection to each other, have always on its opposite side of the segment edges, the plug sleeve units 2-3'Furthermore, the upper and lower wall has peripheral supply lines 10-1, identical to the plug connection detail, as shown in FIG. 2c, which are connected to a supply ring line 10-1 above and below of the multiblock robot system standard cell 1-28 and, if all component segments 1-27 are plug connected to each other, they are composing a complete multiblock robot system standard cell 1-28. In distances to each other, the supply ring lines 10-1 are plug connected with the horizontal supply lines 10-1 which surround the horizontal access channels 12-1, by means of vertical connection lines 10-1. All supply and access channels 10-1', 9'40,112,1-25 and the component segments 1-27 have on its connection periphery and in the respective connection positions, conical sealing rings with the sealing material 2-3", in analogy to FIG. 2b. The multiblock robot system standard cells 1-28, shown in FIG. 3, plug connected one above the other and adjacent to each other, are provided with rotation flexible flange plug connections 18-2, in the range of the connection transitions of the rotation flange plug connection 2-2. Thus, the multiblock robot system standard cells 1-28, are plug connected on separate multiblock robot entrance flange plug booster units 1-26, and between are provided the rotation flexible flange plug connections 18-2. The separate multiblock robot standard entrance plug booster units 1-26 are plug connected by its rotation flange plug connection 2-2, with the foundation flange plug booster units 9'-19 and with the there inside leaded supply lines 10-1. The foundation flange plug booster units 9'-19 are under ground floor supply channels 10-1' with inside supply lines 10-1 and, which have in its end positions rotation flange plug connections 2-2 and non-rotational flange plug connections 2-2'. They are in concrete casted and also freely under the ground floor installed. The shown foundation flange plug booster unit 9'-19, to which the multiblock robot entrance flange plug booster unit 1-26 is plug connected, with above the multiblock robot system standard cells 1-28, is a foundation concrete block with integrated supply channels 10-1', having non-rotational flange plug connections 2-2' leading in different directions, for the plug connection with freely under the ground floor laid supply channels 10-1' and the there integrated supply lines 10-1, as for waste water, drinking water, fuel lines, current and communication lines. In head position is plug connected a separate multiblock robot roof flange plug booster unit 1-32, which is identical to the separate entrance flange plug booster unit 1-26, but has different equipments and sliding doors 1-24' in top position, for the closure of the there provided rotation flange plug connection 2-2 and there ending supply and access channels 10-1'1-25. In this head position are also provided multiblock robot hoist flange plug booster units 1-31. The rotation flexible flange plug booster units 18-2, as also the entrance flange plug booster units 1-26 and the roof flange plug booster units 1-32, are likewise provided with supply and access channels 10-1', 9'40, 12-1, 1-25 with integrated stair case equipment 1-25" and supply lines 10-1. These being in identical position to the supply and access channels 10-1', 9'40, 12-1, 1-25 with integrated stair case equipment 1-25" and supply lines 10-1 of the multiblock rotob system standard cells 1-28. So that after the plug connection, a continuous transition of the supply lines 10-1 to each other is achieved and a continuous transition of the several supply and access channels 10-1 ', 9'-40, 12-1, 1-25, the stair case equipments 1-25" and the supply lines 10-1, from one to the other is composed, which is only separated by the optional sliding doors 1-24. The rotation flexible flange plug connections 18-2 are provided with supply lines 10-1 and access channels 12-1, 1-25, consisting of rotation, tensile and deflection flexible plastics. After composition and plug connection of the multiblock robot total complex, the tackle line and hydraulic lift flange plug booster units 3-25 as like as hydraulic telescope lift platforms, are connected by lift ropes with the several multiblock robot hoist flange plug booster units 1-31 and thus, lifted and lowered over the total length of the vertical access channel 1-25, from the entrance flange plug booster unit 1-26 up to the roof flange plug booster unit 1-32. In the same way, a continuous transition from one concentric staircase equipment 1-25" to the next one above is achieved, after the plug connection of the several building parts one above the other. Always at the periphery, under 90° to each other, are provided four multi-axis multiblock robot articulated arms 9'-14, which have hydraulic flange plug booster units in accordance with U.S. patent application Ser. No. 09/298,204. The multi-axis articulated arms 9'-14 react self operating, released by signals from seismic sensor flange plug booster units 9'-21, to seismic changements and safely absorb earth movements by earthquakes. They have shock-absorber effect and keep the multiblock robot total complex always in a nearly horizontal, balanced state, also in the case of sudden earth sags. Moreover, the rotation flexible flange plug connections 18-2 prevent, that shocks and movements, affecting one multiblock robot system standard cell 1-28, are not transmitted to the adjacent multiblock robot system standard cells 1-28, but are absorbed by the rotation flexible flange plug connections 18-2. In so far, the installation in accordance with FIG. 3 is not only suitable for earthquake, hurricane or otherwise endangered regional and general ground floor conditions, but also for under water installations under difficult current situations and for the installation on other planets.

FIG. 4

Figure 4A:
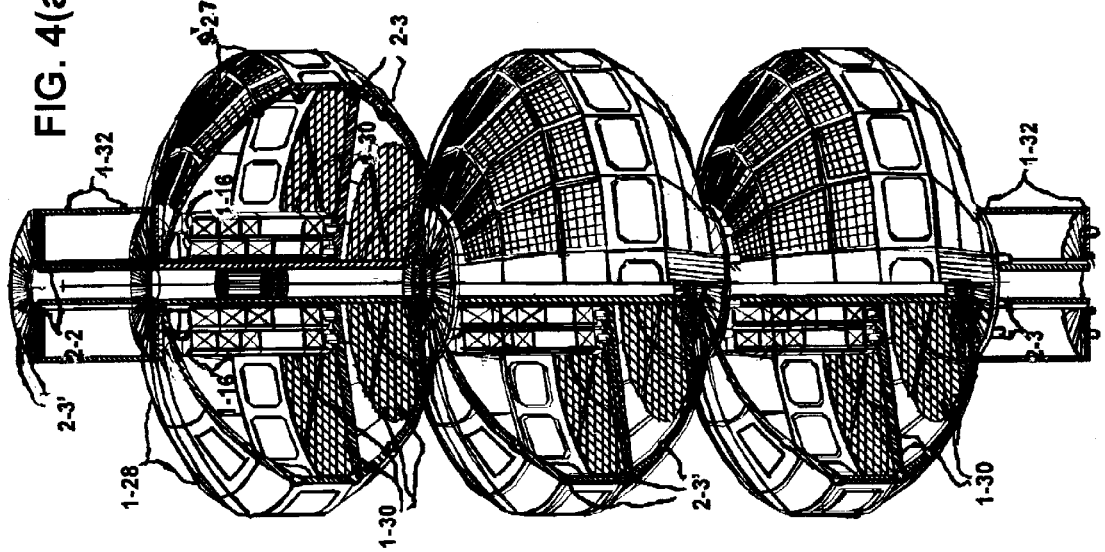

The multiblock robot system standard cells 1-28 have the most different outer contours, and in accordance with the respective objectives and application fields, different inner and outer equipments. The installations shown in FIGS. 4a, 4b are on principal identical. However, the total complex of FIG. 4a has a more sphere shaped outer contour and the total complex of FIG. 4b has a more disc shaped outer contour. Moreover, the installation of FIG. 4b shows, that a roof flange plug booster unit 1-32 is plug connected between both multiblock robot system standard cells 128, whereas the three multiblock robot system standard cells, shown in FIG. 4a, are arranged directly one above the other. The roof flange plug booster unit 1-32, shown in FIG. 4b , is there used as an intermediate flange plug booster unit for the storage of multiblock robot battery units 9'-6 at its periphery, being an energy intermediate store of the multiblock robot total complex and a battery dispenser for multiblock robots. The multiblock robot battery units 9'-6 are recharged by the segment solar flange plug booster unit 9'-27 at the outer contour of the multiblock robot system standard cells 1-28. For the multiblock robot total complexes, shown in FIG. 4a,

*b*, is not provided a staircase equipment 1-25", but only a vertical access channel 1-25 with inside lift equipment, having in its outer walls the supply lines 10-1, thus being in this case a combined vertical access channel 1-25 and supply channel 10-1', reaching from the ground floor rotation flange plug connection 2-2 up to the rotation flange plug connection 2-2, installed in top position. The several multiblock robot system standard cells 1-28 have two intermediate floors and no intermediate walls, so that inside continuous, all around room units are composed. Each intermediate floor is provided with position and direction code train guideways 3-5, in accordance with U.S. patent application Ser. No. 09/298,204, for the fast orientation and positioning of multiblock robots. Furthermore is each multiblock robot system standard cell 1-28 provided with two concentrical, rotatable rings 1-16 which are rotated separately to each other on its ring-shaped tracks 9'-38, by multiblock robot drive units 9'-39, as shown in FIG. 2*b*,

FIG. 5

The multiblock robst system standard cells 1-28 are designed for earth, under water, over water, aviation, rocket, space and planetary tasks. For these objectives, they are provided with the most different assessories and combinations of corresponding multiblock flange plug booster units, sub and system standard cells. In addition they are fully compatible to multiblock robots and offer a multiblock robot favourable and most effective operational environment For these objectives, the multiblock robots are provided with aviation and under water propulsion flange plug booster units, so that they have an easy access to the multiblock robot system standard cells 1-28, independently of the environmental and operational conditions. The aviation equipment consists of multiblock robot standard parts 2-1, plug connected above the head unit, where otherwise for a mere ground floor operation, only the antenna flange plug booster unit 9'-3 or solar flange plug booster units are plug connected. The plug connected multiblock robot standard parts 2-1 are provided with multiblock robot vertical rotor flange plug booster units 9'41 and propulsion flange plug booster units 9'-42, which are plug connected to the horizontal and vertical multiblock robot standard parts 2-1, arranged above the head unit. Furthermore, this multiblock robot standard part 2-1 is provided with fuel channels. As shown in FIG. 5*b*, alternatively or in addition to this equipment, at the back side below the computer unit, to the there plug connected multiblock robot standard part 2-1 and to its rotation flange plug connection 2-2, is a separate multiblock robot control flange plug booster unit 9'-43 plug connected, for the control of the propulsion flange plug booster units 9'-42, being positioned centrally to these units. Below the control flange plug booster unit 9'-43, plug connected to the corresponding vertical rotation flange plug connection 2-2, is provided a separate fuel flange plug booster unit 9'-47. The antenna flange plug booster unit 9'-3 has been disconnected and replug connected to the multiblock robot standard part 2-1, which is arranged above the multiblock robot belt drive flange plug booster unit. For the under water propulsion, the multiblock robots have the equipment, in accordance with FIG. 5*c*. For the under water operations, the multiblock robot standard parts 2-1 have separated fuel flange plug booster units 9'-47 and to its corresponding rotation flange plug connections. 2-2, arranged at the left and the right side, is always one water-rotor flange plug booster unit 9'44 plug connected. Alternatively, and in accordance with U.S. Pat. No. 5,850, 762, there are provided multiblock robot battery booster units 9'-6 plug connected as energy units, instead of the multiblock robot fuel flange plug booster units 9'-47. Multiblock robots are optionally provided with aviation propulsion flange plug booster units 9'-42 and at the same time with under water rotor flange plug booster units 9'-40, and additionally with ground floor suitable belt drive units, so that they are able to operate on the ground floor, under water and in the air, without to change, to disconnect, or to replug connect the corresponding flange plug booster units. For space and planetary objectives, the multiblock robots are provided with rocket flange plug booster units 9'-41, as shown in FIG. 20*c*, as also with the accessory fuel flange plug booster units 9'-43 and with walk or drive flange plug booster units.

FIG. 6

The stationary ground floor multiblock robot total complex comprises three one above the other arranged multiblock robot system standard cells 1-28, in accordance with FIG. 6*a*. Each is rotated around 90° in relation to the other. They are conceptionally identical to each other, however, the outer contour of the lower multiblock robot system standard cell 1-28 is different to the both others, above plug connected. The multiblock robot system standard cell 1-28 in upper position has a retractable platform flange plug booster unit 1-26' which is partly retracted. In head position is a landing platform flange plug booster unit with balustrade 1-33 plug connected and a multiblock flight robot has been landed. The multiblock flight robot is going to be lowered to the inside of the multiblock robot system standard cell 1-28, by a hydraulic flange plug booster unit 3-25, lowered and lifted inside of the vertical access channel 1-25. The three one above the other plug connected multiblock robot system standard cells 1-28, shown in FIG. 6*a*, have totally different outer contours as the multiblock robot system standard cells 1-28, in accordance with FIG. 6*b*, but they are conceptionally identical to each other. To each of the multiblock robot system standard cells 1-28, shown in FIG. 6*b*, is a passable person platform flange plug booster unit 1-33 with ballustrade plug connected.

FIG. 7

The multiblock robot system standard cell 1-28 in ground floor position, shown in FIG. 7*a*, is identical to the multiblock robot system standard cells 1-28 in head and midposition, as shown in FIG. 6*a*. Above this multiblock robot system standard cell 1-28 are provided three rotatable solar flange plug booster units 9'-51, which are plug connected one above the other by means of its own rotation flange plug connections 2-2. The access and supply channel flange plug booster units 9'-50 have the same design characteristic as the access channels 1-25, in accordance with FIG. 1, and are provided with supply lines 10-1. The segment solar flange plug booster units 9'-51 are identical to the design of the rotatable segment solar flange plug booster units 9'-27. Between both of the multiblock robot system standard cells 1-28, as shown in FIG. 7*c*, is a vertical wind rotor flange plug booster unit 9'-49 plug connected, and in head position is plug connected a multiblock robot wind propeller flange plug booster unit 9'-25, in accordance to U.S. Pat. No. 5,852,353. The multiblock robot total complex, as shown in FIG. 7*d*, with the three one above the other plug connected multiblock robot system standard cells 1-28, has in head position vertical multiblock solar-wind flange plug booster units 9'-49' and above it, is plug connected a multiblock robot antenna flange plug booster unit 9'-3. The solar-wind flange plug booster unit 9'-49' is composed of three concentrically arranged, curved and conical vertical wind rotor blade flange plug booster units 9'-48, which are plug connected with the equally curved solar surface flange plug booster units 9'-48. This permits at the same time the current generation of sun and wind, by means of the solar surface flange plug booster units 9'48' and, by means of the vertical wind rotor blade flange plug booster units 9'-52, or only by the sun, or only by the wind, depending on the prevailing weather and sunlight conditions. The generated current is leaded through the vertical supply channel 10-1', to the below plug connected multiblock robot system standard cells 1-28.

FIG. 8

This multiblock robot total complex is located at a harbour quay. The two, one above the other plug connected multiblock robot system standard cells 1-28, have a rectangular contour, and above plug connected rotatable segment solar flange plug booster units 9'-27. These being plug connected to the central, conical roof contour of the multiblock robot system standard cells 1-28. The central, conical roof contour of each multiblock robot system standard cell 1-28 is provided in head position with its own rotation flange plug connection 2-2. Above it are optionally plug connected further multiblock robot system standard cells 1-28 with diameter compatible rotation flange plug connection 2-2, or the most different flange plug booster units. Centrally is positioned the access channel 1-25, which closes in its head position likewise with its own rotation flange pug connection 2-2, having a different diameter and being able to be plug connected with other, diameter compatible rotation flange plug connections 2-2, respectively with flange plug booster units. Always at the short ends of the outsides of the multiblock robot system standard cells 1-28 are provided access channels 1-25, having in its head positions likewise its own rotation flange plug connections 2-2. The tackle line and hydraulic lift flange plug booster units 3-25 within the lateral access channels 1-25 are provided for the withdrawal and taking over of multiblock cool box flange plug booster units 1-12 and multiblock robots, in accordance with U.S. patent application 09/298,204. The multiblock robot system standard cell 1-28 in head position is going to exchange loads to a multiblock robot e-pool transporter and its multiblock robot system standard cell 1-28, as the coolbox flange plug booster units 1-12. These are lifted and lowered between both multiblock robot system standard cells 1-28. The multiblock robot e-pool transporter is positioned by position and direction code train guide-ways 3-5 for the deposition and taking over of coolbox flange plug booster units 1-12. At the left side are exchanged, lifted and lowered, cool box flange plug booster units 1-12 between the multiblock robot system standard cell 1-28 of the multiblock total complex and a multiblock robot ship unit with its multiblock robot system standard cell 1-28. For the take over and delivery of the cool box flange plug booster units 1-12, the multiblock robot ship unit is self operating positioned by an own approximation sensor ring flange plug booster unit 9'-15 around the outer contour, and the signal exchange with the approximation sensor ring flange plug booster unit 9'-15, at the outer contour of the entrance flange plug booster unit 1-26. For the take over and deposition of the coolbox flange plug booster units 1-12 from and to the multiblock robot system standard cell 1-28 in head position, the multiblock robot system standard cell 1-28 in bottom position of the multiblock robot total complex is rotated around 90°, so that the multiblock robot system standard cell 1-28 above is free for loading and unloading. If the multiblock robot system standard cell 1-28 in bottom position has to be loaded or unloaded, it is likewise rotated around 90° in direction of the multiblock ship unit, respectively to the multiblock robot e-pool transporter. The stationary ground floor multiblock robot total complexes and also individual installations of multiblock robot system standard cells 1-28, are provided for general applications, as productions, offices, labs, residence objectives, hotels, restaurants, for specific applications like television stations, astro researchs, multiblock robot e-pool computer centers, with the respective, necessary inner equipment being completed with additional outside multiblock robot flange plug booster units.

FIG. 9

Figure 8:
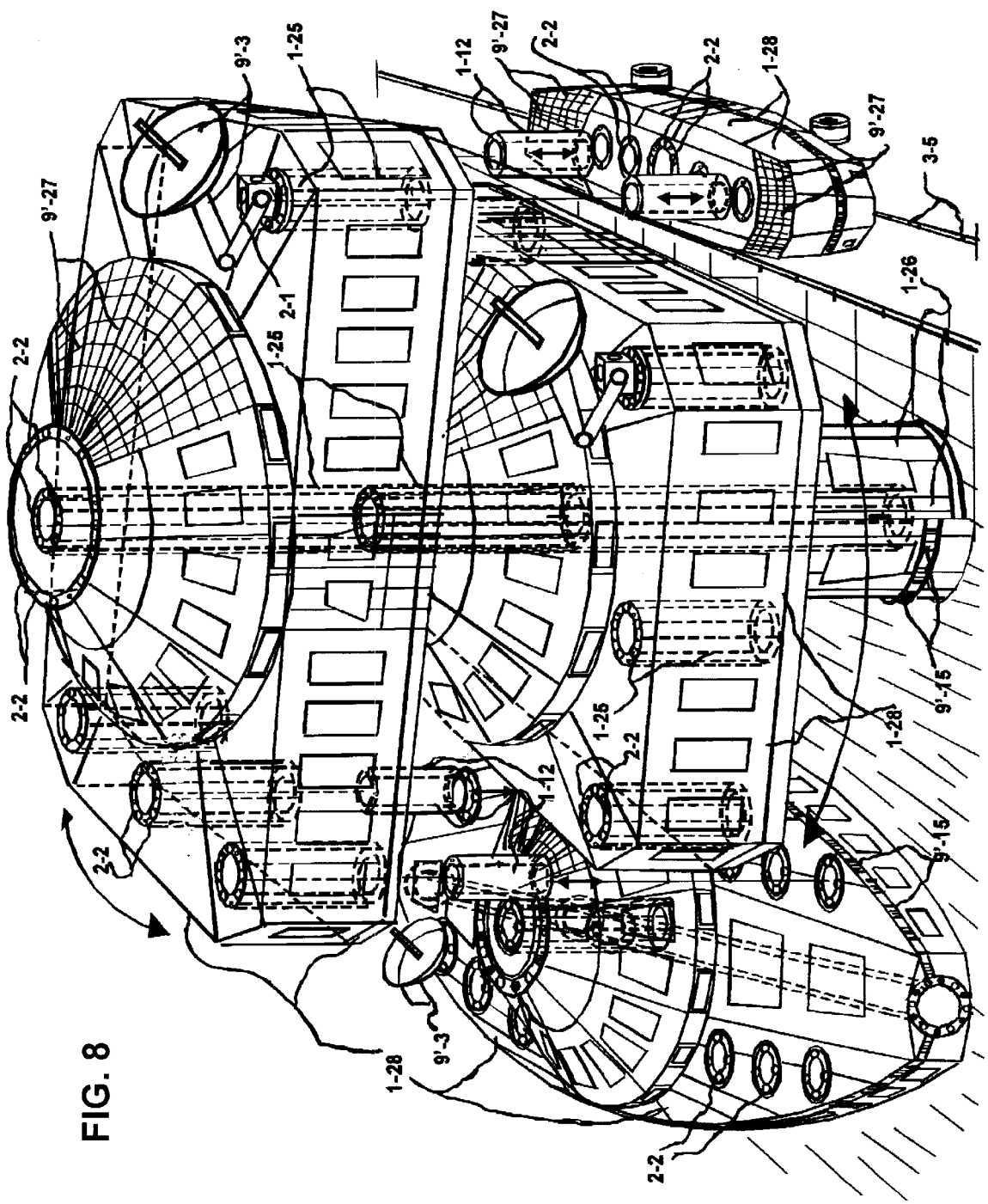
FIG. 8, the perspective illustration of a multiblock robot harbour total complex with two, one above the other, plug connected multiblock robot system standard cells, having an identical outer contour, whereas the multiblock robot system standard cell in head position is rotated around 90° and, to the right of the center line showing, the floor-bounded load and unload of a mobile multiblock robot system standard cell and, to the left of the center line showing, the sea-bounded load and unload of a mobile, in water moved multiblock robot system standard cell.

The multiblock e-pool transporters are conceptionally designed as the e-pool individual vehicles. The multiblock robot system standard cell 1-28, plug connected to the vehicles chassis flange plug booster unit 9'-8, has a similar contour like the greater spaced multiblock robot system standard cell 1-28, in accordance with FIG. 1, but the width is reduced, for the unhindered operation on roads and optionally on rails, in the case of multiblock e-pool robot rail and road transporters and buses. There are likewise provided central entrance flange plug booster units 1-26 with rotating inside compartments 9'-28. Depending on the requirements, transporter and buses have in addition driver seats or load cabin units, and these also being combined with cool box flange plug booster units 1-12, as shown in FIG. 8, which are vertically withdrawable and lowerable, being arranged closely one behind and side by side to each other, inside of the multiblock robot system standard cells 1-28. Multiblock robot e-pool individual vehicles and the e-pool transporter, in accordance with the U.S. patent application Ser. No. 09/298,204, are equally provided with plug connected multiblock robot system standard cells 1-28. Conceptionally, the multiblock robot system standard cells 1-28 for individual vehicles are identical to the design, shown in FIG. 9a. They are plug connected on a multiblock robot vehicle chassis flange plug booster unit 9'-8, having multiblock robot drive units 9'-9. The inner equipment corresponds to the objectives of road vehicles. The multiblock robot system standard cell 1-28 consists of a back and front part, shaped like vehicle body parts, being plug connected to each other and on the central rotation flange plug connection 2-2 of the multiblock robot chassis flange plug booster unit 9'-8. Near to the connection line between the back and front part, at the bottom section of the multiblock robot system standard cells 1-28, directly above its central, outer rotation flange plug connection 2-2, for the plug connection to the rotation plug connection 2-2 of the vehicles flange plug booster unit 9'-8, is provided a second central, inside rotation flange plug connection 2-2. To this is plug connected the entrance flange plug booster unit 9'-37, composed of the two, from above withdrawable and lowerable, inside partial segment flange plug booster units 1-12', Both inside partial segment flange plug booster units 1-12' have in roof and bottom positions non rotatable flange plug connections 2-2'. The back sided inside partial segment flange plug booster unit 1-12' is used as a load unit and the front sided as a passenger unit, having passenger seats and control equipment for all functions of the multiblock robot e-pool individual vehicles. The inside entrance flange plug booster unit 9'-37 with its both partial segment flange plug booster units 1-12' is freely rotatable around 360°, giving free access to the passenger and the load units through the side openings 9'-37'. For fully self operating multiblock robot e-pool individual vehicles are optionally provided, always mirror imaged combinations of load units and passenger units, as only load or only passenger units for the back and front partial segment flange plug booster units 1-12'. In the case of a plug connection only with passenger units, the passenger seats are not arranged mirror imaged but all in the same front driving direction. Conceptionally, a multiblock robot planetary ground floor vehicle has a chassis, identical to a road multiblock robot e-pool individual vehicle, but it is foldable from the mid-axis to the longitudinal axis, so that during the space transport, the needed volume is reduced, and it has optional belt or wheel drive flange plug booster units 9'-9. On the central rotation flange plug connection 2-2 of the vehicles chassis flange plug booster unit 9'-8, is plug connected an oxygen flange plug booster unit 1-12 for the oxygen supply of pilots, which in its mechanical function is identical to the inside flange plug booster units 1-12, 1-12' of the spool individual vehicles. But in addition to the multiblock robot standard part 2-1, centrally plug connected to the vehicles chassis flange plug booster unit 9'-8 for the rotation of the inside flange plug booster units 1-12, 1-12' around 360°, is provided a multiblock robot oxygen pump flange plug booster unit 9'-33, having moreover an oxygen tank flange plug booster unit 9'-47, identical to the fuel flange plug booster units 9'-47, provided for the multiblock robots, in accordance with FIG. 5. Thus, oxygen is pumped by the multiblock robot pump flange plug booster unit 9'-33 to the multiblock robot oxygen flange plug booster unit 1-12, as soon as this unit is rotated around, and the side openings 9'-37' of the inside entrance flange plug booster unit 9'-37 are dosed. As such, the whole oxygen flange plug booster unit 1-12 has the effect of an oxygen device without additionally necessary accessory devices, in which the pilots are able to breathe freely, e.g. without oxygen masks. The oxygen flange plug booster unit 1-12 is also provided in an identical design, as an air sluice for under water works. In that case, after the entrance of a diver into the oxygen flange plug booster unit 1-12, the likewise intruded water is pumped out and simultaneously oxygen is pumped in. The multiblock robot planetary ground floor vehicle, provided for multiblock space robots, has not an oxygen flange plug booster unit 1-12, but a foldable platform flange plug booster unit 1-12", with the front part for the plug connection of a multiblock robot antenna unit 9'-3, the mid-part for the access of the multiblock space robots with both sided steps, and the back part for the plug connection of a solar flange plug booster unit 9'-25.

FIGS. 10, 11

The stationary multiblock robot total sea complex is plug connected on foundation flange plug booster units 9'-19, installed in sea regions. The multiblock robot system standard cells 1-28 are plug connected on separate vertical access channels 1-25'. These have also support column character. The separate vertical access channels 1-25' for the accomodation of tackle line and hydraulic lift plug booster units 3-25, are additionally surrounded by staircase equipments 1-25" and are sheathed by supply channels 10 -1' and fluid channels 9'-40, in accordance of the previous fig. Depending on the static point of views, the separate vertical access channels 1-25' are leading centrally right through the individual multibloc robot system standard cells 1-28 up to the head position and above it, as shown in FIG. 17a, having an additional central support column function for the entire multiblock robot total complex. Between each of the one above the other plug connected multibloc robot system standard cells 1-28, is plug connected a multiblock robot vertical wind rotor flange plug booster unit 9'-49. Furthermore, in head position is plug connected a multiblock wind propeller flange plug booster unit 9'-52, for the energy autonomous current supply of the multiblock robot total complex, and a multiblock robot helicopter, in accordance with FIG. 15, is landed on the multiblock robot air landing plattform flange plug booster unit 1-34. The several, separated vertical access channels 1-25' are rectangularly positioned to each other and plug connected on rotation flange plug connections 2-2 with separate, outer horizontal access channels 12-1, being conceptionally identical to the access channels 12-1, inside of the multibloc robot system standard cells 1-28. Therefore, depending on the respective application requirements, they are also sheathed by supply channels 10-1' and fluid channels 9'-40. The outer access channels 12-1 have laterally, above and below of its traversing course, rotation flange plug connections 2-2. The outer, horizontal access channels 12-1 are plug connecting the several, in the same height to each other, already vertically plug connected multibloc robot system standard cells 1-28, with the internal horizontal access channels 12-1, so that a transition and passage is achieved of persons and multiblock robots, as also the exchange of supply materials and supply fluids, of current and communications, on the shortest ways, from one section of the multiblock robot total complex to the adjacent section. The outer horizontal access channels 12-1 compose rectangular frames to each other in the identical height with the transitions to the vertical access channels 1-25', but also above and below in optional other heights, which are used as the most different application fields. Thus, an application field for fishing is composed by a fishing net 1-36 which stretches between the adjacently separate vertical access channels 1-25' and above the laterally arranged rotation flange plug connections 2-2 of the tackle line and hydraulic lift plug booster units 3-25, and of these being taken in, respectively lowered. Accordingly, there are provided optional application fields, as for sea water desalting, but also for farming, the production of sea ground treasures, recovering of averages by means of the multiblock flight and underwater robots, in accordance with FIG. 5, and of the equipments, in accordance with FIG. 12. Moreover, for processing and other objectives, needed for the self sufficient supply of the multiblock robot total sea complex, but also for the supply of external regions. For the sea water desalting application fields, the sea water is leaded to the corresponding application fields through the fluid channels 9'-40, in accordance with FIG. 1, and by means of multiblock fluid pumps 9'-33. The produced drinking water is leaded to especially provided fluid channels 9'-40' and, in addition to the self supply of the own multiblock robot total sea complex, it is also leaded to the mainland or to other multiblock robot total sea complexes in greater distances installed, through horizontal fluid access channels 9'-40', laid down on the sea ground. Likewise for the surplus of current, which is generated by multiblock sun and wind flange plug booster units and application fields of the multiblock robot total sea complex, exceeding the needed own consumption, being equally transmitted to the mainland and other consumers, by supply channels 10-1', laid down along the sea ground. In addition, own productions of the multiblock robot total sea complex are transported by multiblock robot ship units 1-34, being loaded through the outer, horizontal access channels 12-1, fluid channels 9'-40 and supply lines 10-1. A goods, material, person and multiblock robot exchange is also provided by multiblock robot helicopter units which, like the multiblock flight robots, are landing and taking off on and from the landing platforms 1-34.

FIG. 12

Figure 11:
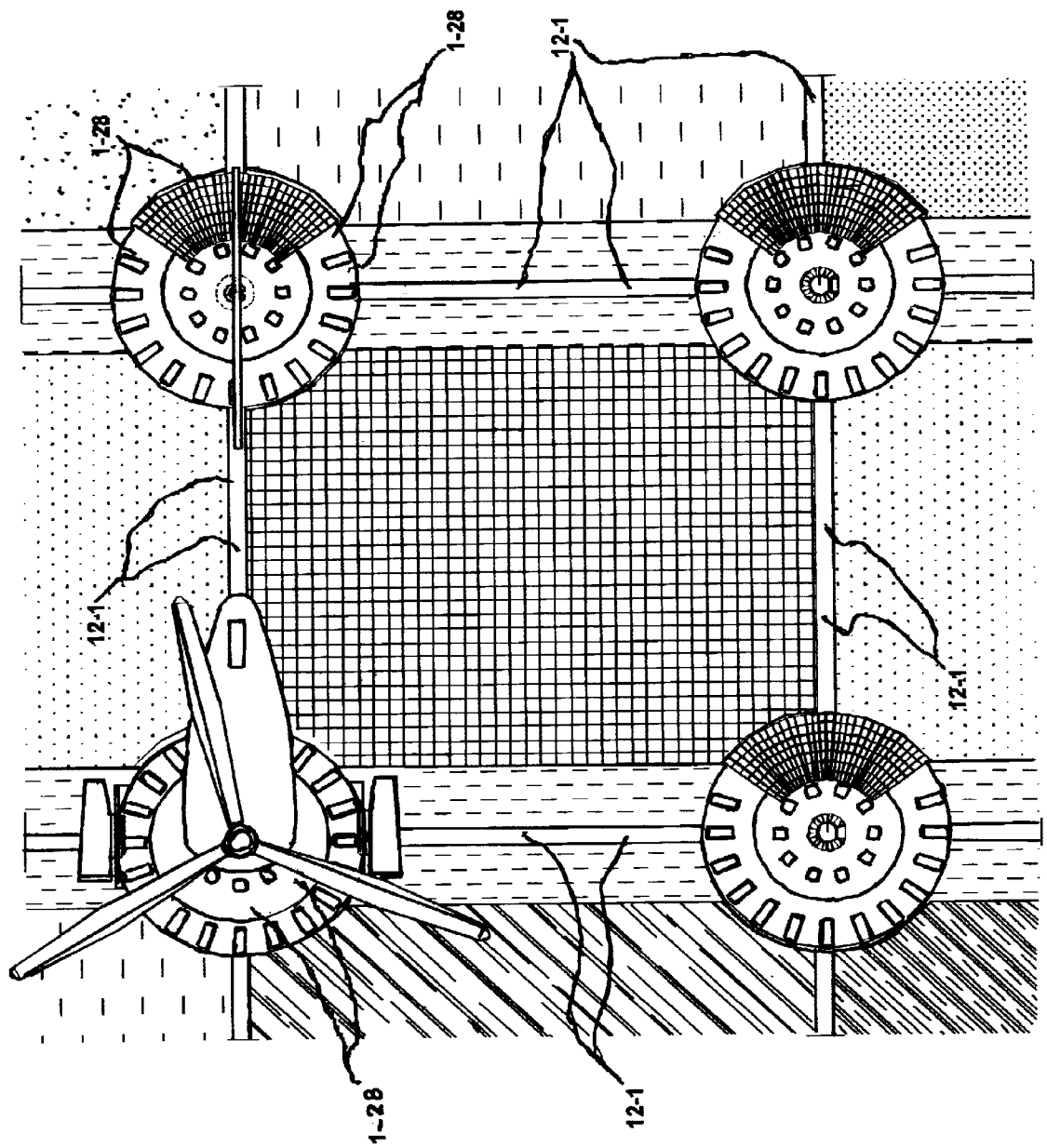
FIG. 11, the plain view of a multiblock robot total sea complex in accordance with FIG. 10, showing the multiblock application fields.
Figure 16:
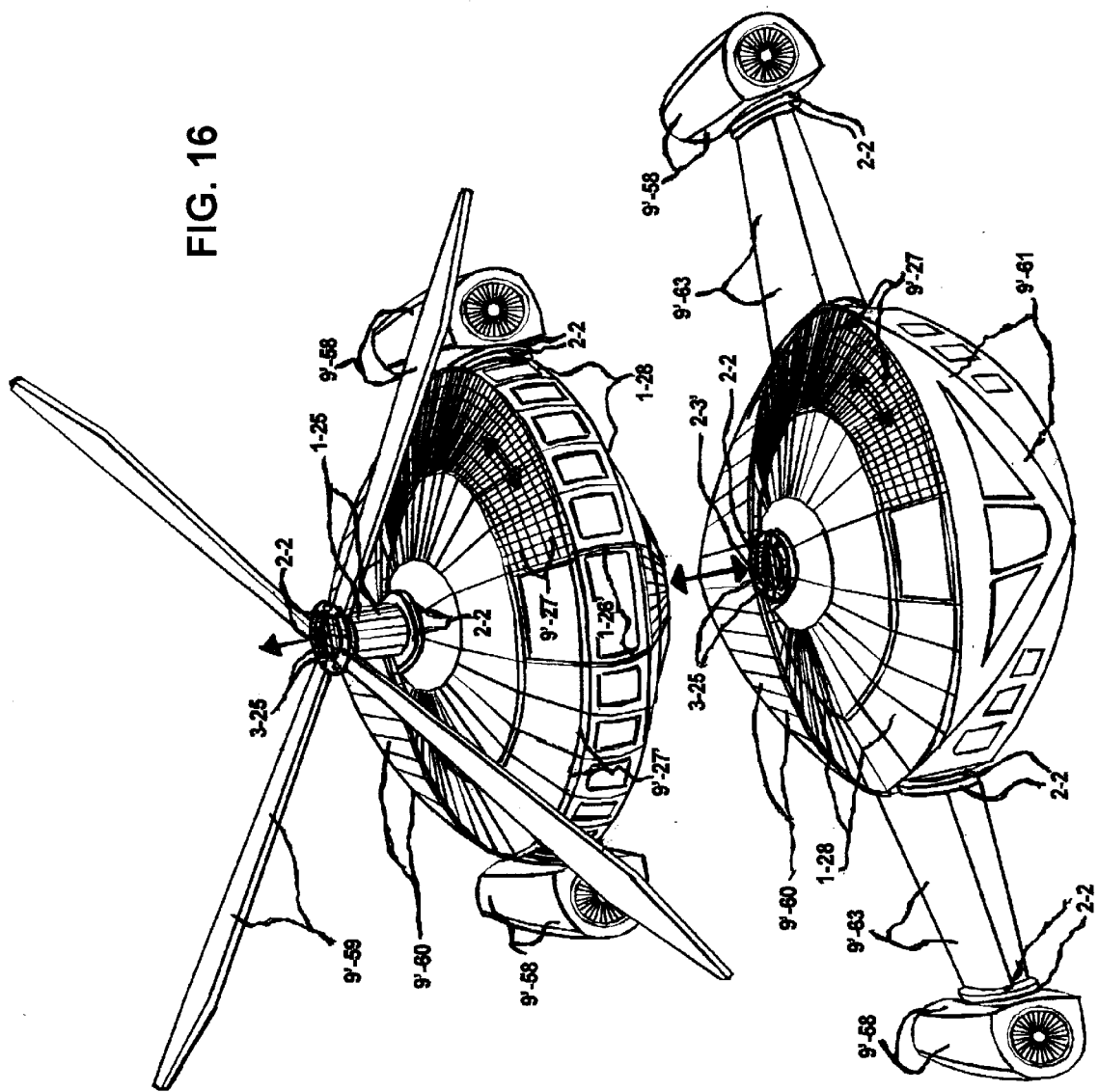
FIG. 16, the perspective view of a multiblock robot helicopter with tail flange plug booster unit and docking to a multiblock robot airplane.

The multiblock robot total sea complex is similarly designed as the multiblock robot total sea complex of FIGS. 10, 11. However, multibloc robot system standard cells 1-28 are additionally provided under water, guided on the separate vertical access channels 1-25', lifted and lowered by the multiblock robot hoist flange plug booster units 1-31 which are plug connected laterally to the separate vertical access channels 1-12'. The multiblock robot hoist flange plug booster units 1-31 inside of the separate vertical access channels 1-25, are also for multiblock robot total sea complexes always plug connected in upper position, after composition and plug connection of the multiblock robot total sea complex, so that after lift-rope connection with the respective tackle line and hydraulic lift plug booster units 3-25, these are lifted and lowered inside and along of the separate vertical access channels 1-25' total lift height, from the sea ground up to the head position. For the access from the separate vertical access channels 1-25' to the under water situated multiblock robot system standard cells 28, are provided non rotatable flange plug connections 2-2', laterally in several heights on the separate vertical access channels 1-25', being closed by sliding doors, respectively opened, if the corresponding access openings inside of the respective multiblock robot system standard cells 1-28 which are actually under water, are lifted or lowered up to the identical, same heights. The multiblock robot system standard cell 28, landed on the sea ground, is provided with self operating multiblock robot submerge, propulsion and ground movement equipment. For the submerge operations, the internal fluid channels 9'-40' are used as flood tanks and, in correspondence with the submerge operations, they are flooded or pumped out respectively. For the propulsion is provided a multiblock robot propulsion screw flange plug unit 9'-54, and for the horizontal direction changements are plug connected rudder flange plug booster units 9'-53 to the stem of the submerged multiblock robot system standard cell 1-28. These equipments are also plug connected to the stems, and to the there installed rotation flange plug connections 2-2, of over water driving multiblock robot system standard cells 1-28. The sea ground drive is achieved by multiblock robot belt flange plug booster units 9'-29 and, the balanced drive over jagged and rough grounds and the steady keeping in an always horizontal position during the sea ground drive of the multiblock robot system standard cells 1-28, is achieved by multiblock robot articulated arms 9'-14. The submerged sea ground driving multiblock robot system standard cell 1-28 is laterally docking to a rotation flange plug connection 2-2, for the transition and access to the separate vertical access channel 1-25'. The outer contour of all multiblock robot system standard cells 1-28, operating over water and under water, being guided by the separate vertical access channels 1-25', as also of the multiblock robot system standard cells 1-28, being submerged but being fully self operating with its own driving equipment, is nearly similar to each other and to the multiblock robot system standard cell2 1-28, as shown in FIG. 12c. The underwater submerged, vertically guided and otherwise selfoperating multiblock robot system standard cells 1-28, are used for geological researchs, under water labs and for the producing of solid, fluid and gaseuos minerals and substances recovering objectives, fishing and further underwater applications. Conceptionally, the installation of multiblock robot total sea complexes is not limited to sea regions, but they are likewise provided for mainland, space and planetary objectives.

FIG. 13

Multiblock robot swim and submerge capable individual and total complexes, consist of multiblock robot system standard cells 1-28, in accordance with FIG. 12c, which are equipped with propulsion screw flange plug booster units 9'-54 and rudder flange plug booster units 9'-53. The overwater driving multiblock robot system standard cells 1-28 are optionally individually driven or, to serveral one behind the other, plug connected with its rotation flexible bow and stem flange plug connections 18-2, these being designed, as shown in FIG. 2. In the case of several plug connected multiblock robot system standard cells 1-28 one behind the other, only for the last multiblock robot system standard cell 1-28 of the sea-compund is provided a rudder and screw flange plug booster unit 9'-54, 9'-53, for driving and heading the total arrangement. Moreover, multiblock robot system standard cells 1-28 are provided on ship carrier flange plug booster units 1-34, individually or several one behind the other, on rotation flange plug connections 2-2, in a corresponding distance to each other. In this case, only the ship carrier flange plug booster unit 1-34 is provided with propulsion screw and rudder flange plug booster units 9'-54, 9'-53. The bow and stem rotation flexible flange plug connections 18-2 between each multiblock robot system standard cell 1-28, are not applicated, but non rotational flange plug connections 2-2' are provided, for the transition from one multiblock robot system standard cell 1-28 to the other. The horizontal connection is also provided by separately laid, outer horizontal access channels 12-1, which are arranged below or above the multiblock robot system standard cells 1-28.

FIG. 14

The over water and under water driving multiblock robot individual units and total complexes are provided with telescope access channels 1-37, being plug connected on rotation flange plug connection 2-2 bottom positions of the multiblock robot system standard cells 1-28. By means of the intermediate multiblock robot standard part 2-1, a telescope access channel 1-37 is rotated up to 360° around the own axis and up to 180° in vertical direction, close under the bottom of the multiblock robot system standard cell 1-28. During the drive to the prospective sea region, the telescope access channel 1-37 is retracted and rotated up to the horizontal position, under the bottom of the multiblock robot system standard cell 1-28. For sea ground works, the telescope access channel 1-37 is provided with multiblock articulated arms 9'-14, gripper, excavator and other multiblock robot flange plug booster units 9'-56 for under water and sea ground works, and also with under water cameras 9'-33, all plug connected to the rotation flange plug connections 2-2 at the bottom position of the telescope access channel 1-37. There are moreover provided drill head flange plug booster units 9'-57 for sea ground drills and conveyor means for producing gaseuos, fluid and solid minerals and substances. Furthermore is provided in bottom position an access opening 1-24 with sliding door 1-24' for the access of divers and under water multiblock robots. Additionally, the telescope access channels 1-37 are headed for docking by under water operating multiblock robot system standard cells 1-28. The docking operation and for this the reaching of a transition congruent position, being controlled by means of approximation sensors 9'-21, provided in head position on rotation flange plug connections 2-2 of the multiblock robot system standard cells 1-28 and in opposite head position on rotation flange plug connections 2-2, provided at the bottom section of the telescope access channels 1-37. After completion of the docking operation, the multiblock robot system standard cells 1-28 are freely vertically moved up and down by its own submerge ability, being vertically guided by the telescope channels 1-37 and having steady access to the telescope access channels 1-37. The telescope access channels 1-37 are conceptionally designed as the separate vertical access channels 1-25', but in correspondence with the requirements, they have internal continuous conveyor means, for the continuous conveyance of gaseous, fluid and solid minerals and substances from the sea ground to the sea surface and to the multiblock robot individual and total sea complexes. The entire equipment of the over water driving multiblock robot system standard cells 1-28, with telescope channels 1-37 and with the corresponding accessory flange plug booster units, is also provided, supported and guided for directly under water and in deep sea submerged operating multiblock robot system standard cells 1-28. For the individual operation of divers, the oxygen flange plug booster unit 1-12 is lowered from a laterally arranged, vertical access channel 1-25, of the multiblock robot system standard cell 1-28.

FIGS. 15, 16

The aviation capable multiblock robot system standard cells 1-28 are optionally provided with propulsion flange plug booster units 9'-58 and vertical rotor flange plug booster units 9'-59, which are laterally and centrally in head position, plug connected on rotation flange plug connections 2-2, of the multiblock robot system standard cells 1-28. Additionally, there are provided optional folding tail and cockpit flange plug booster units 9'-62, 9'-61, plug connected on the back and front rotation flange plug connection 2-2. The folding is operated by means of multiblock robot articulated arms 9'-14 and multiblock robot standard parts 2-1. The folding tail and cockpit flange plug booster units 9'-62, 9'-61 have each one landing operative multiblock robot floor ground drive unit 9'-9 and one small dimensioned adjustment floor ground drive unit 9'-9 at the endpoint of the under side. Each of the folding tail and cockpit flange plug booster units 9'-62, 9'-61 have two foldable outside flange plug booster units 9'-60', connected to each other by means of the multiblock robot articulated arms 19'-14. For the aviation completion, the tail and cockpit flange plug booster units 9'62, 9'-61 are pushed together, in direction of the central rotation flange plug connections 2-2. The positioning is controlled by the approximations sensors 9'-21 being opposite to each other on the rotation flange plug connections 2-2, which are provided on the tail and cockpit flange plug booster units 9'-62,9'-61 and horizontally and vertically on the multiblock robot system standard cells 1-28. If the right adjusted position is reached, the multiblock robot articulated arms 19'-14 close the two foldable outside flange plug booster units 9'-40, and all plug units 2-3 and plug sleeves 2-3' of the tail and cockpit flange plug booster units 9'-62, 9'-61 are engaged to the counterpart plug units 2-3 and plug sleeves 2-3' of the rotation flange plug connections 2-2 of the multiblock robot system standard cells 1-28. After the plug connection of the tail and cockpit flange plug booster units 9'62,9'-61 and the engagement of the plug units 2-3 and plug sleeves 2-3' of the rotation flange plug connections 2-2, are all access and supply channels 12-1, 10-1', 9-40 with its integrated current communication and fluid lines 10-1, in accordance with FIG. 1, 1, immediately closed and to each other interconnected. The adjustment floor ground drive unit 9'-9 is only used for the plug connection operation of the tail and cockpit flange plug booster units 9'-62,9'-61 with the multiblock robot system standard cells 1-28 and is folded to the inside, when closing the flange plug booster units 9'-40, so that only the front and back sided arranged multiblock robot floor ground drive units 9'-9 are finally effective as landing operative ground floor drive units 9'-9 for the completed multiblock robot aviation unit. The tail flange plug booster units 9'-40 are provided with side rudder flange plug booster units 9'-62 for horizontal flight maneuverings and with additional propulsion flange plug booster units 9'-58, which are plug connected to the rear position of the tail flange plug booster units 9'-40. The cockpit flange plug booster units 9'-61 have multiblock robot control and board computer flange plug booster units, cockpit seat flange plug booster units and further flange plug booster units, needed for carrying out flight operations. The vertical rotor flange plug booster units 9'-59 have an optional number of three or four rotor blades, and are plug connected on the central rotation flange plug connection 2-2, so that the central, lockable vertical access channel 1-25, with its sheathing supply channels 10-1', is not restricted in its function and transition to and from the outside out of the top position, after the plug connection of vertical rotor flange plug units 9'-59. The multiblock robot aviation units are not only capable to takeoff and land vertically by means of the plug connection with the vertical rotor flange plug booster units 9'-59, but also by plug connection with propulsion flange plug booster units 9'-58 on the outsides of the multiblock robot system standard cells 1-28. There, being freely rotatable around 360° and thus having horizontal and additionally vertical propulsion functions. In correspondance with the flight effective requirements, the multiblock robot aviation units are provided without the tail and cockpit flange plug booster units 9'-62,9'-61, only with a cockpit flange plug booster unit 9'-61, only with a tail flange plug booster units 9'-62, only with lateral propulsion flange plug booster units 9'-58, only with the vertical rotor flange plug booster unit 9'-59 and the rear sided propulsion flange plug booster unit 9'-58 and, with further optional combinations of the catalog of multiblock robot standard parts, flange plug booster units and system standard cells 1-28 to each other.

FIG. 17

The multiblock robot aviation complex consists of a multiblock robot system standard cell 1-28 with a radar flange plug booster unit 9'-3 in ground floor position. Above the multiblock robot system standard cell 1-28, is a retractable platform flange plug booster unit 1-26' plug connected and a separate multiblock robot entrance flange plug booster unit 1-26, rotated around 180°, with internal equipment for the objectives of a control tower, as for air traffic controll of vertical takeoff and landing operations of multiblock robot aviation units. The central, separate vertical access channel 1-25' is plug connected to a foundation flange plug booster unit 9'-19, in accordance with the preceding fig., and leads through the several, central rotation flange plug connections 2-2. In head position of the separate access channel 1-25' is provided a rotation flange plug connection 2-2 with approximation sensors 9'-21 and a hoist flange plug booster unit 1-31. There are moreover provided inside tackle line and hydraulic lift plug booster units 3-25 and laterally, lockable rotation flange plug connections 2-2 and access openings 1-24. The multiblock robot helicopters and the vertical takeoff and landing capable aviation units, are guided by the signals from the approximation sensors 9'-21 of the rotation flange plug connections 2-2 and are self operating vertically and horizontally precise positioned and, with its own propulsion units, are rotated around 90° for the vertical landing, lowered and softly landed on top of the already landed multiblock robot airplane, the multiblock helicopter, or in the case of not yet landed multiblock robot airplane or helicopter, directly on the rotation flange plug connection 2-2 of the entrance flange plug booster unit 1-26. For the takeoff and landing operations, the different one above the other landed multiblock robot aviation units, are rotated with its wing flange plug booster units 9'-63, so that during the takeoff and landing of the multiblock robot aviation units in upper position, the propulsion reflections hit not the multiblock robot aviation units below it. In accordance with the flight requirements, the wing flange plug booster units 9'-63 of the multiblock robot airplanes and helicopters are also optionally provided and plug connected, laterally to the rotation flange plug connections 2-2 of the multiblock robot system standard cells 1-28. Than, the propulsion flange plug booster units 9'-58 are plug connected in end position, and additionally above or below of the wing flange plug booster units 9'-63. Thus, the wing flange plug booster units 9'-63 and all plug connected propulsion flange plug booster units 9'-58 are individually, freely rotatable around 360°, being able to control the flight height movements. In so far, there is an option to control the vertical takeoff and landing by the rotation of the wing flange plug booster units 9'-63 around 90°, together with its plug connected propulsion flange plug booster units 9'-58, for having the most reduced air resistance during the takeoff operations. For refuel operations, the exchange of materials, persons, multiblock robots, in the air during the flight, the multiblock robot aviation units are self operating positioned one above the others, by means of the approximation sensors 9'-21. And, by the central, vertical access channels 1-25 with the sheathing supply lines 10-1, a temporary rotation flange plug connection 2-2 is closed between the multiblock robot aviation units, from the airplane or helicopter to the above docked multiblock airplane or helicopter.

FIGS. 18, 19, 20, 21

Figures 18A, 18B, 18C:
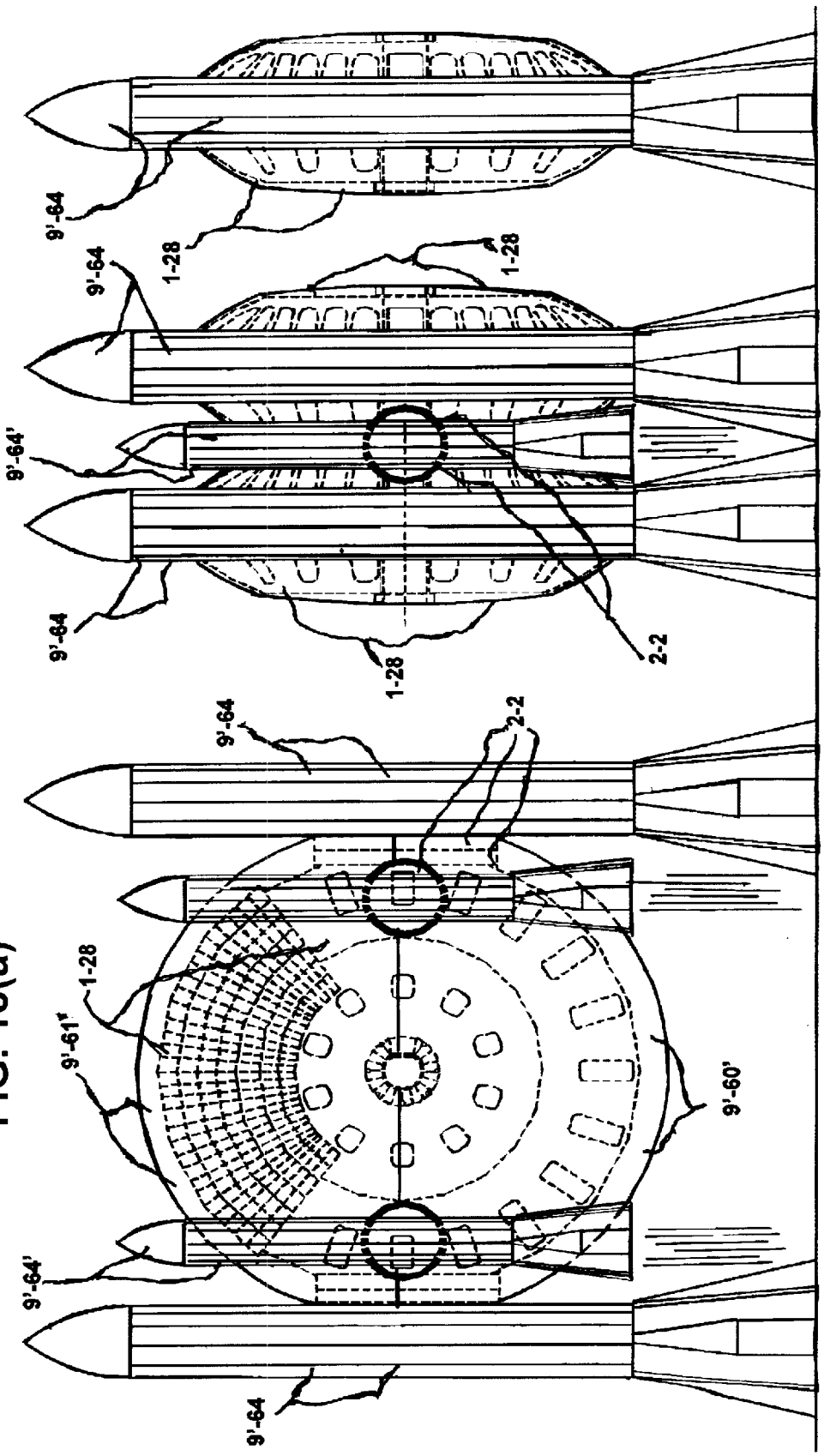
FIGS. 18a,b,c, the front view of a multiblock robot total space complex, ready for liftoff from the ground, with centrally arranged multiblock robot system standard cells, outside multiblock robot liftoff rocket flange plug booster units, as also with left and right sided liftoff-space rocket flange plug booster units; the side view of a multiblock robot space complex with two, directly side by side and centrally arranged multiblock robot system standard cells, left and right sided multiblock robot liftoff rockets and centrally plug connected liftoff-space rocket flange plug booster units; the side view of a multiblock robot space station liftoff complex with one, centrally arranged multiblock robot system standard cell, provided with tail flange plug booster unit and view to the liftoff rocket flange plug booster unit.
Figure 19:
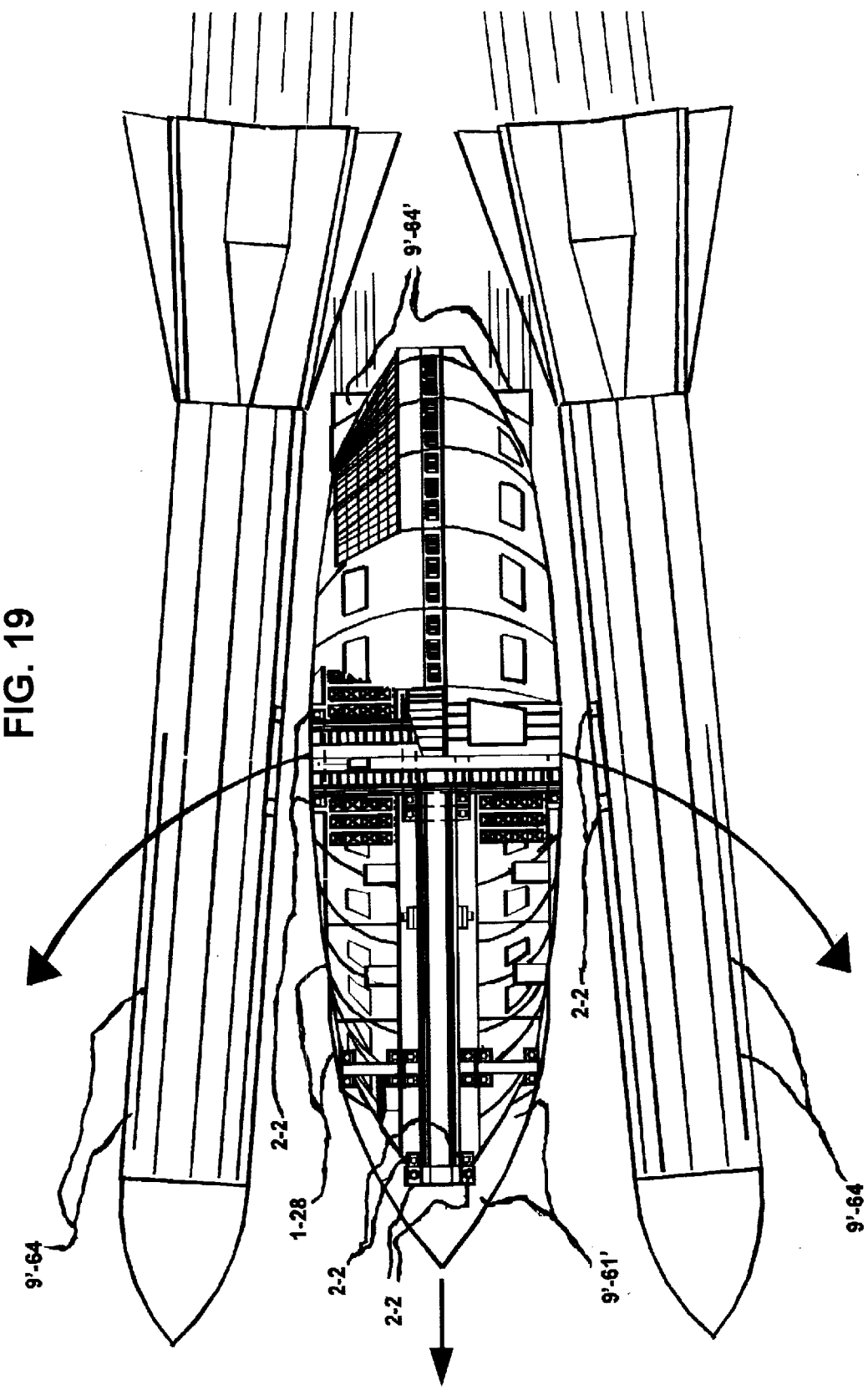
FIG. 19, die side view of a multiblock robot total space complex, disconnecting the liftoff rockets and switching over to the tail space rocket flange plug booster unit.

A multiblock robot total space complex consists of the multiblock robot system standard cells 1-28 with the laterally, on rotation flange plug connections 2-2 plug connected, liftoff rocket flange plug booster units 9'-64 and optionally, above and below plug connected liftoff-space rocket flange plug booster units 9'-64'. Moreover, the multiblock robot system standard cells 1-28 are provided with plug connectable tail and nose flange plug booster units 9'-60', 9'-61'conceptionally in accordance with the tail and cockpit flange plug booster units 9'-62, 9'-61 for multiblock robot aviation units, however for the total multiblock robot space complex having the objective to protect against overheating if going through the stratosphere and, being a shield against hits of space particles and radiations. The multiblock robot total space complex does not need a launching ramp. The longer and heavier dimensioned liftoff rocket flange plug booster units 9'-64 are combined plug connected with the smaller and lightweight dimensioned liftoff-space rocket flange plug booster units 9'-64'. Or, the multiblock robot system standard cells 1-28 are plug connected with internal, in rear position provided liftoff-space rocket flange plug booster units 9'-64' and these are combined with liftoff-space rocket flange plug booster units 9'-64', plug connected laterally, above and also below of the multiblock robot system standard cells 1-28. For the liftoff from the ground, the smaller liftoff-space rocket flange plug booster units 9'-64' are at first fired for a short time, until the heavier liftoff rocket flange plug booster units 9'-64 are lifted free from the ground. Than, these are fired and the liftoff-space rocket flange plug booster units 9'-64' are switched off. After reaching the stratosphere and the orbit, the liftoff rocket flange plug booster units 9'-64 are optionally disconnected and pushed off from its rotation flange plug connections 2-2, whereas at the same time, the liftoff-space rocket flange plug booster units 9'-64' are again fired for the propulsion into space. In accordance with the danger situations and requirements in space, the nose and tail heat, particle and radiation protection flange plug booster units 9'-60, 9'-61 are likewise disconnected from its rotation flange plug connections 2-2 and pushed off, or they are retained. Extensive multiblock robot total space complexes comprise, in accordance with FIG. 18b, two one above the other plug connected multiblock robot system standard cells 1-28, always with two laterally plug connected liftoff rocket flange plug booster units 9'-64, and between each being provided a liftoff-space rocket flange plug booster unit 9'-64'. Reaching the aimed space position, through the lateral access channels 12-1 and the horizontal access channels 1-25 of the multiblock robot system standard cells 1-28, are disembarked and exchanged space pilots, multiblock space robots and space satellites. The multiblock space robots are conceptionally designed, as shown in FIG. 5. However, they are provided with liftoff-space rocket flange plug booster units 9'-64'. Each multiblock robot total space complex is suitable to be applied as a space station but also as a planetary station for other planets. Depending on the total liftoff weight, the multiblock robot total space complexes are also lifted off from separate vertical access channels 1-25', sheathed by the supply channels 10-1', in accordance with FIGS. 10, 12 and 17, where the multiblock robot system standard cells 1-28 are vertically and horizontally guided during the liftoff operation, by the separate vertical access channels 1-25' with its sheathed supply channels 10-1'. The separate vertical access channels 1-25' are dimensioned for the liftoff operations of multiblock robot total space complexes, but also additionally for the takeoff and landing of multiblock robot aircrafts and helicopters. Moreover, equally depending on the total liftoff weight of the multiblock robot total space complexes, they are provided with own vertical rotor flange plug booster unist 9'-59, and are vertically lifted to great heights of the air space. There, the vertical rotor flange plug booster units 9'-59 are disconnected from its rotation flange plug connections 2-2 and pushed off to the earth by a parachute flange plug booster unit 9'-66, which up to this moment has been covered within the vertical access channels 1-25 of the vertical rotor flange plug booster units 9'-59. Simultaneously, the real liftoff rockets 9'-59 are fired. In space, the multiblock robot total space complexes are self operating positioned by means of the approximation sensors 9'-21, for docking one above, behind and side by side to each other, for fuel operations and the exchange of persons, materials and multiblock robots. As for all multiblock robot individual systems and total complexes, also for multiblock robot total space complexes, is the compatibility maintained to each other and to all multiblock robot standard parts, flange plug booster units, as also to the multiblock robot system standard cell units 1-28 of the whole multiblock robot system catalog, and its ability to be optionally plug connected, combined, disconnected and exchanged to each other.

I claim:

1. A multiblock robot system comprising:
   to each other compatible and plug connectable stationary and mobile earth, sea, aviation and space flight capable multiblock robot system standard cells, multiblock robot flange plug booster units and multiblock robots, composed with minimal expenditure of development and construction, in any desired combination to each other and to the total spectrum of all multiblock robot standard parts;

said multiblock robot system with said stationary and mobile earth, sea, aviation and space flight capable multiblock robot system standard cells, multiblock robot flange plug booster units and multiblock robots, provided with rotation and non rotational flange plug connections and with approximation sensors for plug combination and at any time interchangeable composition to multiblock robot individual systems and total, mainland, sea, aviation, space and planetary complexes.

2. A multiblock robot system as claimed in claim 1 wherein:

said multiblock robot system standard cells are provided with vertical and horizontal access and supply channels, said vertical and horizontal access and supply channels comprising tackle line and hydraulic lift flange plug booster units, said vertical access and supply channels being enclosed of staircase installations and of fluid channels, said vertical access and supply channels leading current, communication and fluid supply lines, said vertical access and supply channels as a whole composing functional and operational said multiblock robot rotation flange plug connections and non rotational flange plug connections, said rotation flange plug connections having in end positions at the outer contour turning attachments with internal driving motors, said vertical and horizontal access, supply, control and fluid channels, of said rotation and non rotational flange plug connections, forming part of said multiblock robot system standard cells, being flanged together with a multitude of others of said multiblock robot standard cells, said flange plug booster units, and said vertical and horizontal access, supply, control and fluid channels, adjacent to each other, by means of engaging plugs and plug sleeves, but said flange plug booster units, and said vertical and horizontal access, supply, control and fluid channels, as also all plug connected multiblock robot system standard cells, being always freely rotatable around 360° relative to the center axis, whereas for all rotational positions, the access and transition to said vertical and horizontal access, supply, control and fluid channels is always preserved.

3. A multiblock robot system as claimed in claim 1 wherein:

said standardized multiblock robot individual systems and total complexes are provided with concentric removeable rings for the accomodation of material and devices, enclosing vertical and horizontal access, staircase installation, and supply channels, having access and passage openings, said multiblock robot system standard cells are provided with internal intermediate walls, sliding doors and intermediate floors, said multiblock robot system standard cells having inside an entrance flange plug booster unit with sliding doors to the outside and inside direction and access to the horizontal access channels, said multiblock robot system standard cells provided with a retractable platform booster unit, installed above said inside entrance flange plug booster unit and being covered to the outside by a balustrade, said multiblock robot system standard cells, are provided on the outer contour with rotatable segment solar flange plug booster units and with window openings, said multiblock robot system standard cells for the mobile operations, are provided with outside peripheral sensor ring flange plug booster units, said multiblock robot system standard cells are composed of plug connected component segments, which are provided with said plug and plug sleeve units and with sealing material along the segment sides for plug connection to each other and for plug connection with said central rotation flange plug connections, said component segments are provided with supply lines and said supply lines being vertically arranged above and below in peripheral position, for the connection with said horizontal supply lines which enclose said horizontal access channels.

4. A multiblock robot system as claimed in claim 1 wherein:

said standardized multiblock individual systems and total complexes are provided with separate entrance and roof flange plug booster units which have horizontal access channels, staircase installations and supply channels which are provided for said standardized multiblock system cells, said separate entrance and roof flange plug booster units are provided with additional storage volume for multiblock robot battery flange plug booster units and other materials, said standardized multiblock system cells are provided with separate intermediate and landing platform flange plug booster units, with and without a balustrade, said standardized multiblock system cells are provided with separate vertical access channel flange plug booster units comprising tackle line and hydraulic lift flange plug booster units, in addition to central internal access channels of said standardized multiblock system cells, for the throughout vertical conveyance of multiblock cool box and oxygen flange plug booster units, said standardized multiblock system cells and said flange plug booster units being provided with rotation flexible flange plug connections for the rotation, thrust and vibration flexible plug connection between all of said standardized multiblock system cells, said flange plug booster units, said multiblock robot standard parts and said standardized multiblock robot individual systems and total complexes, which are optionally adjacently arranged, one beneath the other, below and above to each other, said standardized multiblock cells and flange plug booster units are provided with multiblock robot articulated arms, being a multi-axis flexible vertical and horizontal support, absorbing shocks, pressure, shifts and vibrations, lifting free and keeping in balanced horizontal and vertical position, all of said stationary and mobile multiblock robot individual systems and total complexes, in regions with unsecure floor ground circumstances, in earthquake, hurricane and flood water endangered regions.

5. A multiblock robot system as claimed in claim 1 wherein:

said stationary and mobile multiblock robot individual systems and total complexes are provided with separate solar and wind rotor flange plug booster units, vertical wind rotor flange plug booster units and, combined vertical solar-wind rotor flange plug booster units with solar flange plug booster units, being attached to the concentrical rotational rotors conical outer segments of said vertical solar-wind rotor flange plug booster units, said stationary and mobile multiblock robot individual systems and total complexes are provided with separate vertical access channels, identical to the design of the internal central vertical access channels of said multiblock robot system standard cells and of all flange plug booster units, having takle line and hydraulic lift plug booster units, as also staircase installations, enclosed by fluid channels and supply channels for current, communication and fluids lines, said separate vertical access channels, composing a vertical support for said multiblock robot system standard cells and said flange plug booster units, plug connected one above the other, said separate vertical access channels provided with lateral access openings, said rotation flange and non rotational flange plug connections, said takle line and hydraulic lift plug booster units, said staircase installations, said fluid channels and said supply channels for current, communication and fluid lines, leading through all of said multiblock robot system standard cells, flange plug booster units and separate vertical access channels, plug connected one above the other, said separate vertical access channels and said separate solar and wind rotor, vertical wind rotor and combined vertical solar-wind rotor flange plug booster units, being provided with vertical and horizontal access channels, staircase installations and supply channels and having at the end positions rotation flexible plug connections for the rotation flexible connection with all of said multiblock robot system standard cells, separate flange plug booster units, said multiblock robot standard parts and said multiblock robot systems and total complexes, which are optionally adjacently arranged, one beneath the other, below and above to each other.

6. A multiblock robot system as claimed in claim 1 wherein:

said mobile robot individual systems are composed by said multiblock robots system standard cells, being vertically lifted, lowered and plug connected to multiblock robot e-pool individual vehicles, transporters and buses, said multiblock robot system standard cells of said multiblock robot e-pool individual vehicles being provided with centrally plug connected, entrance flange plug booster units which are freely rotatable around 360°, said entrance flange plug booster units being provided with lateral openings and two identical, mirror imaged arranged inside partial segment flange plug booster units which have likewise said lateral openings, being congruent to said lateral openings of said inside rotation compartment flange plug booster units, said mirror imaged arranged inside partial segment flange plug booster units composing a load cabin for loads and materials, and a passenger cabin for operational devices and for the installation of vehicle seats, being each independently freely lowered, lifted and separately vertically plug connected to said non rotational plug connections, provided inside of said entrance flange plug booster units, said load and passenger cabins being freely accessible by a rotation around 90° of said entrance flange plug booster units, said multiblock robot e-pool transporters and buses, provided inside of said standardized multiblock robot system cells with a multitude of said vehicle seats, said passenger and load cabins and with multiblock robot cool box flange plug booster units, arranged on behind the other and side by side to each other, individually vertically lowered and lifted from and to the inside of said multiblock robot system standard cells, said mobile robot individual systems comprising multiblock robot planetary vehicles, composed of centrally collapsible multiblock robot wheel and belt drive chassis flange plug booster units, provided with said entrance flange plug booster units, being centrally plug connected multiblock robot wheel and belt drive flange plug booster units, said entrance flange plug booster units for said multiblock robot planetary vehicles being provided with said load and passenger cabins, having inside oxygen and space pilot operational flange plug booster units and multiblock space robot entry flange plug booster units, plug connected to said non rotational flange plug connections of said entrance flange plug booster units, said oxygen flange plug booster units with said space pilot operational flange plug booster units, being likewise applicable for under water tasks, as an air sluice for divers.

7. A multiblock robot system as claimed in claim 1 wherein:

said total stationary multiblock robot sea complexes are centrally plug connected to separate vertical access channels, said separate vertical access channels of said total stationary sea complexes being the ground support and plug connected to foundation plug booster units on the sea ground and, above the sea level, being the intermediate vertical support, plug connected between said individual multiblock robot system standard cells arranged one above the other, and said foundation flange plug booster units, said separate vertical access channels, are design identical with the internal horizontal access channels of said multiblock robot system standard cells, being likewise enclosed of the corresponding supply channels, said separate vertical access channels, being plug connected to design identical separate horizontal access channels, composing the most different multiblock robot application fields as for solar and wind current generation, fishing, sea water desalting, for farming, production, recovering of ship averages by multiblock robot flight and under water robots, processing of all kinds for the self sufficient operation of said total stationary and mobile multiblock robot sea complexes and for the supply of external regions, said separate horizontal access channels, integrated with said supply and fluid channels, laid down along the sea ground for the transportation of fluids and current, for the supply of a multitude of said total stationary and mobile multiblock robot sea complexes and to the mainland, said separate horizontal access channels, integrated with said supply and fluid channels being provided above the sea level for the docking of multiblock robot ship units, the goods exchange above said integrated fluid and supply lines and the ship transport of said multiblock robot application field productions, said total stationary multiblock robot sea complexes having in top position, landing platform plug booster units, for the goods exchange by vertical landing multiblock robot aviation systems and of multiblock flight robots, said total mobile multiblock robot sea complexes are composed of said multiblock robot system standard cells, designed as mobile over water and under water individual multiblock robot sea systems, being provided with driving screw flange plug booster units, and rudder flange plug booster units, said mobile over water individual multiblock robot sea systems, driving individually and with a multitude one behind the other in a convoy, connected to each other by said rotation flange plug connections, driven and navigated by only one of said driving screw and rudder flange plug booster units, provided for the last in the queue of said over water individual multiblock robot sea systems, said mobile over water individual multiblock robot sea systems being composed of said multiblock robot system standard cells and of ship carrier flange plug booster units and, said multiblock robot system standard cells individually and also in a multitude arranged one behind the other and in corresponding distances to each other being plug connected on said rotation flange plug connections, provided on said ship carrier flange plug booster units and these being provided with said driving screw and rudder flange plug booster units, said total and individual mobile over water and under water multiblock robot sea systems are provided with plug connected under bottom telescope access channels, said under bottom telescope access channels are freely rotatable around 360° and being retracted and rotated to the horizontal position below the multiblock robot system standard cells during the drive onwards and to the working sea position, said under bottom telescope access channels being provided with multiblock robot articulated arms, grippers and other multiblock robot flange plug booster units for under water sea ground works, as like as with under water multiblock robot camera and vision flange plug booster units, with excavator and drilling head flange plug booster units for sea ground drilling works and conveyance of fluids gaseous and solid materials and substances, said under bottom telescope access channels, being provided with access openings and sliding doors for the access of divers and multiblock robots in sea ground position, and said rotation flange plug connections of said access openings having approximation sensors for a precise positioning and congruent adjustment and plug connection with said rotation flange plug connections, provided also on the bow of others of said mobile under water multiblock robot sea systems, operating under water and docking for a vertical guidance and a continuous access to said under bottom telescope access channels during under water operations with own driving power, said under bottom telescope access channels, being conceptionally designed like said separate vertical access channels and having additional conveyor equipment for the continuous conveyance of fluid, gaseous and solid minerals and substances from the sea ground to the sea surface and to said stationary and mobile individual and total multiblock robot sea systems and sea complexes, said under bottom telescope access channels, and the whole equipment of said mobile over water operating multiblock robot system standard cells, being also provided for said mobile under water multiblock robot system standard cells for the direct support and guidance during under water operations and, for the operation of divers, oxygen flange plug booster units being vertically lifted and lowered from and to said access channels which are arranged vertically in lateral position, said mobile and stationary individual and total multiblock robot sea systems and complexes being identically and to each other combined plug connected and provided on the mainland, in space and on other planets.

8. A multiblock robot system as claimed in claim 1 wherein:

said multiblock robot individual aviation systems comprise multiblock robot helicopters and vertical takeoff capable airplanes, composed of said multiblock robot system standard cells, being provided with propulsion flange plug booster units, plug connected laterally to said rotation flange plug connections, having horizontal supply channels, said multiblock robot system standard cells being provided with vertical rotor flange plug booster units, plug connected to said rotation flange plug connections, centrally provided and leading vertically said access channels with sheathing vertical supply channels through said vertical rotor flange plug booster units, said multiblock robot system standard cells being combined with said propulsion flange plug booster units and said vertical rotor flange plug booster units, and being separately provided only with said propulsion flange plug booster unit, or only with sait vertical rotor flange plug booster unit, said multiblock robot system standard cells being provided with tail and cockpit flange plug booster units, plug connected to said rotation flange plug connections provided at the front and rear sides, said tail and cockpit flange plug booster units are provided with said multiblock robot standard parts, adjustment floor ground drive units, said approximation sensors, articulated arms for adjusting, folding, closing and plug connecting said tail and cockpit flange plug booster units to said rear and front rotation flange plug connections of said multiblock robot system standard cells, and having additionally landing operative drive flange plug booster units, said tail flange plug booster units being additionally provided with said propulsion flange plug booster units and with side rudder flange plug booster units, plug connected to said rotation flange plug connections in rear position, said cockpit flange plug booster units being provided with multiblock robot control and board computer flange plug booster units, with cockpit seat units and further units, necessary for flight operations, said multiblock robot system standard cells having in accordance with the needed flight requirements, wing flange plug booster units, plug connected by means of said lateral rotation flange plug connections and being freely rotatable around 360°, for height control and vertical takeoff operations, reducing the air resistance during the vertical takeoff, said wing flange plug booster units having above, below and in end position on said wing rotation flange plug connections, said propulsion flange plug booster units, and being also freely rotatable around 360°, for vertical takeoff propulsion and additional height control operations, said tail, cockpit, wing, propulsion, vertical rotor, rudder, drive flange plug booster units combined to each other and to said multiblock robot system standard cells, all with said internal access and supply channels and said current, communication and fluid lines, being imediatly interconnected to each other by the plug connection operations of said horizontal and vertical rotations flange plug connections.

9. A multiblock robot system as claimed in claim 1 wherein:

said multiblock robot total aviation complexes are comprising multiblock robot total takeoff and landing complexes, composed of said multiblock robot system standard cells, plug connected in ground position on foundation flange plug booster units, having above a retractable platform flange plug booster unit and a multiblock roof flange plug booster unit with internal equipments of a control tower for the air and landing traffic control of multiblock robot aviation units, these being provided with said guiding approximation sensors on said rotation flange plug connections in head and bottom positions of said multiblock robot system standard cells, said multiblock robot system standard cells with said roof flange plug booster units, provided with centrally plug connected separate vertical access channels, leading freely from said foundation flange plug booster units, through said rotation flange plug connections, centrally provided one above the other, on said multiblock robot system standard cells and on said roof flange plug booster units, said multiblock robot aviation units, multiblock robot helicopters and vertical takeoff capable airplanes, being self operated guided and precisely positioned by the signal exchange between said approximation sensors, provided in head and bottom position on said multiblock system standard cells and in head position of said separate vertical access channels and, by means of its own propulsion flange plug booster units, said multiblock aviation units being lowered and landed on said rotation flange plug connections in head position of said multiblock aviation units below, already landed, or being directly landed on said rotation flange plug connections in head position of said roof flange plug booster units, said multiblock robot aviation units being rotated with its wing and vertical rotor flange plug booster units, by means of said rotation flange plug connections in head and in bottom positions of all said multiblock robots system standard cells and of all multiblock robot flange plug booster units, so that during the landing and takeoff operations, the propulsion radiation hits not said wing and vertical rotor flange plug booster units of said multiblock robot aviation units already landed below, said multiblock robot aviation units, multiblock robot helicopters and vertical takeoff capable airplanes, in the air being self operating positioned and docked to each other by means of said approximation sensors on said rotation flange plug connections, for refuel operations and the exchange of persons, multiblock robots and materials.

10. A multiblock robot system as claimed in claim 1 wherein:

said multiblock robot total space complexes are composed of said multiblock robot system standard cell units having laterally on said rotation flange plug connections, heavy weight liftoff rocket flange plug booster units and optionally above and below plug connected light weight liftoff-space rocket flange plug booster units, said multiblock robot system standard cell units are provided with nose and tail heat, particle and radiation protection flange plug booster units, said multiblock robot total space complexes are lifting off by short first firing of the said liftoff and space rocket flange plug booster units, so that said multiblock robot total space complexes are lifted free from the ground, and after that, by firing said liftoff-space rocket flange plug booster units, whereas the liftoff rockets are switched off, and after reaching the orbit, the liftoff rockets optionally being disconnected and pushed off from said rotation flang plug connections and the space flight being continued by means of the liftoff-space rocket flange plug booster units, said multiblock robot total space complexes are provided with two of said multiblock robot system standard cells, being plug connected one above the other, each laterally plug connected with two of said liftoff rocket flange plug booster units and between each of said liftoff rocket flange plug booster units, having one of said liftoff-space rocket flange plug booster units, said multiblock robot total space complexes are lifted off from separate vertical access channels with sheathing supply channels, being also applicated as takeoff and landing complex for multiblock robot aviation and helicopter units, whereas said multiblock robot system standard cells are vertically and horizontally arranged for the takeoff operations and are centrally guided by said internal access channels, and along of said separate vertical access channels having said sheathing supply channels, said multiblock robot total space complexes are provided with own vertical rotor flange plug booster units, being plug connected centrally on said rotation flange plug connections and, said multiblock robot total space complexes are vertically lifted off to great air heights and there, said vertical rotor flange plug booster units being disconnected from said rotation flange plug connections and are lowered to the earth by parachute flange plug booster chambers, being covered within said central rotation flange plug connection, whereas are simultaneuosly fired said liftoff-space rocket flange plug booster units, said multiblock robot system standard cells of said multiblock robot space complexes exchanging through said access channels, being provided laterally, horizontally and vertically, pilots, satellites, multiblock robot planetary vehicles, multiblock space robots, said multiblock robot space robots being plug connected with rocket propulsion flange plug booster units, said multiblock robot total space complexes lifted off entirely, as complete units and placed in space and on other planets, said multiblock robot total space complexes placed one above and below the other, behind and beneath to each other, selfoperating positioned to each other by means of said approximation sensors, temporary and in the long run plug connected and docked for refuel operations, the exchange of persons, of said multiblock space robots and of materials, said multiblock robot total space complexes, equally as all of said multiblock robot individual systems and total complexes, being plug connection, access, and supply compatible to each other and to all of said multiblock robot standard parts, to all of said flange plug booster units, as also to said multiblock robot system standard cells of the whole multiblock robot catalog, and having the ability to be optionally plug connected, combined, disconnected and exchanged to each other, by means of said rotation flange plug connections and said non rotational flange plug connections.

* * * * *